US012662112B2

(12) United States Patent
Fukui et al.

(10) Patent No.: US 12,662,112 B2
(45) Date of Patent: Jun. 23, 2026

(54) DRIVING ASSISTANCE DEVICE, DRIVING ASSISTANCE METHOD, AND STORAGE MEDIUM

(71) Applicant: TOYOTA JIDOSHA KABUSHIKI KAISHA, Toyota (JP)

(72) Inventors: Yusuke Fukui, Toyota (JP); Takashi Moriya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/112,580

(22) Filed: Feb. 22, 2023

(65) Prior Publication Data

US 2023/0322213 A1     Oct. 12, 2023

(30) Foreign Application Priority Data

Mar. 24, 2022     (JP) ................................. 2022-048249

(51) Int. Cl.
*B60W 30/09*     (2012.01)
*B60W 10/184*     (2012.01)
*B60W 10/20*     (2006.01)

(52) U.S. Cl.
CPC .......... *B60W 30/09* (2013.01); *B60W 10/184* (2013.01); *B60W 10/20* (2013.01);
(Continued)

(58) Field of Classification Search
CPC .... B60W 30/09; B60W 10/184; B60W 10/20; B60W 2554/4041; B60W 2554/804; B60W 2710/18; B60W 2710/20; B60W 2720/106; B60W 2720/24; B60W 2420/403; B60W 2420/408; B60W 2520/10; B60W 2520/105; B60W 2520/125; B60W 2520/14; B60W 2540/18;
(Continued)

(56) References Cited

U.S. PATENT DOCUMENTS 5,332,057 A     7/1994  Butsuen et al.
2003/0067219 A1     4/2003  Seto et al.
(Continued)

FOREIGN PATENT DOCUMENTS

EP     2763118 A1     8/2014
EP     2763119 A1     8/2014
(Continued)

*Primary Examiner* — Ramya P Burgess
*Assistant Examiner* — Preston Jay Miller
(74) *Attorney, Agent, or Firm* — Dinsmore & Shohl LLP

(57)     ABSTRACT

A driving assistance device executes dual-side braking steering avoidance control for forcibly decelerating a target vehicle by applying braking forces to wheels on both sides of the target vehicle and forcibly turning the target vehicle to swerve around an object in a case where a turning amount increase request condition is not satisfied. When forcibly turning the target vehicle rightward or leftward by collision avoidance control to swerve around the object in a case where the turning amount increase request condition is satisfied, the driving assistance device executes single-side braking steering avoidance control for forcibly decelerating the target vehicle by applying a braking force only to a right or left wheel of the target vehicle and forcibly turning the target vehicle to swerve around the object.

19 Claims, 16 Drawing Sheets

(52) U.S. Cl.
   CPC .............. *B60W 2554/4041* (2020.02); *B60W 2554/804* (2020.02); *B60W 2710/18* (2013.01); *B60W 2710/20* (2013.01); *B60W 2720/106* (2013.01); *B60W 2720/24* (2013.01)

(58) Field of Classification Search
   CPC ... B60W 2554/4042; B60W 2554/802; B60W 10/18; B60Y 2300/09
   USPC .......................................................... 701/26
   See application file for complete search history.

(56)                References Cited

U.S. PATENT DOCUMENTS

| | | | | |
|---|---|---|---|---|
| 2012/0179349 | A1* | 7/2012 | Yamakado | B60W 30/045 |
| | | | | 701/89 |
| 2014/0067252 | A1* | 3/2014 | Knoop | G08G 1/167 |
| | | | | 701/400 |
| 2014/0136044 | A1* | 5/2014 | Conrad | G01S 13/931 |
| | | | | 701/23 |
| 2014/0229069 | A1* | 8/2014 | Akiyama | B62D 6/002 |
| | | | | 701/41 |
| 2014/0257593 | A1* | 9/2014 | Igarashi | G06V 20/58 |
| | | | | 701/1 |
| 2014/0316668 | A1* | 10/2014 | Akiyama | B60W 10/20 |
| | | | | 701/70 |
| 2016/0193999 | A1 | 7/2016 | Sasabuchi | |
| 2016/0194000 | A1* | 7/2016 | Taki | B60W 30/08 |
| | | | | 701/70 |
| 2018/0162392 | A1* | 6/2018 | Takaki | B60W 10/18 |
| 2018/0239359 | A1* | 8/2018 | Jian | B60W 60/0053 |
| 2018/0346028 | A1* | 12/2018 | Chang | B60W 10/04 |
| 2020/0377079 | A1* | 12/2020 | Sung | B60W 30/0956 |
| 2020/0391733 | A1* | 12/2020 | Kumagai | B60T 8/17558 |
| 2021/0114588 | A1* | 4/2021 | Komuro | B60W 10/18 |
| 2021/0253092 | A1* | 8/2021 | Miyamoto | B60W 30/09 |
| 2021/0370914 | A1* | 12/2021 | Li | B62D 11/00 |
| 2022/0289174 | A1 | 9/2022 | Hashimoto et al. | |
| 2023/0234573 | A1* | 7/2023 | Iwase | B60W 30/0956 |
| | | | | 701/26 |
| 2023/0286496 | A1* | 9/2023 | Ogino | B60W 30/09 |

FOREIGN PATENT DOCUMENTS

| | | | |
|---|---|---|---|
| EP | 2763120 | A1 | 8/2014 |
| JP | H05-058319 | A | 3/1993 |
| JP | 2003-112618 | A | 4/2003 |
| JP | 2006-062397 | A | 3/2006 |
| JP | 2007-125997 | A | 5/2007 |
| JP | 5246176 | B2 | 7/2013 |
| JP | 2021-056604 | A | 4/2021 |
| JP | 2021-128619 | A | 9/2021 |
| WO | 2015/008380 | A | 3/2017 |

* cited by examiner

FIG. 4

FIG. 8A                 FIG. 8B
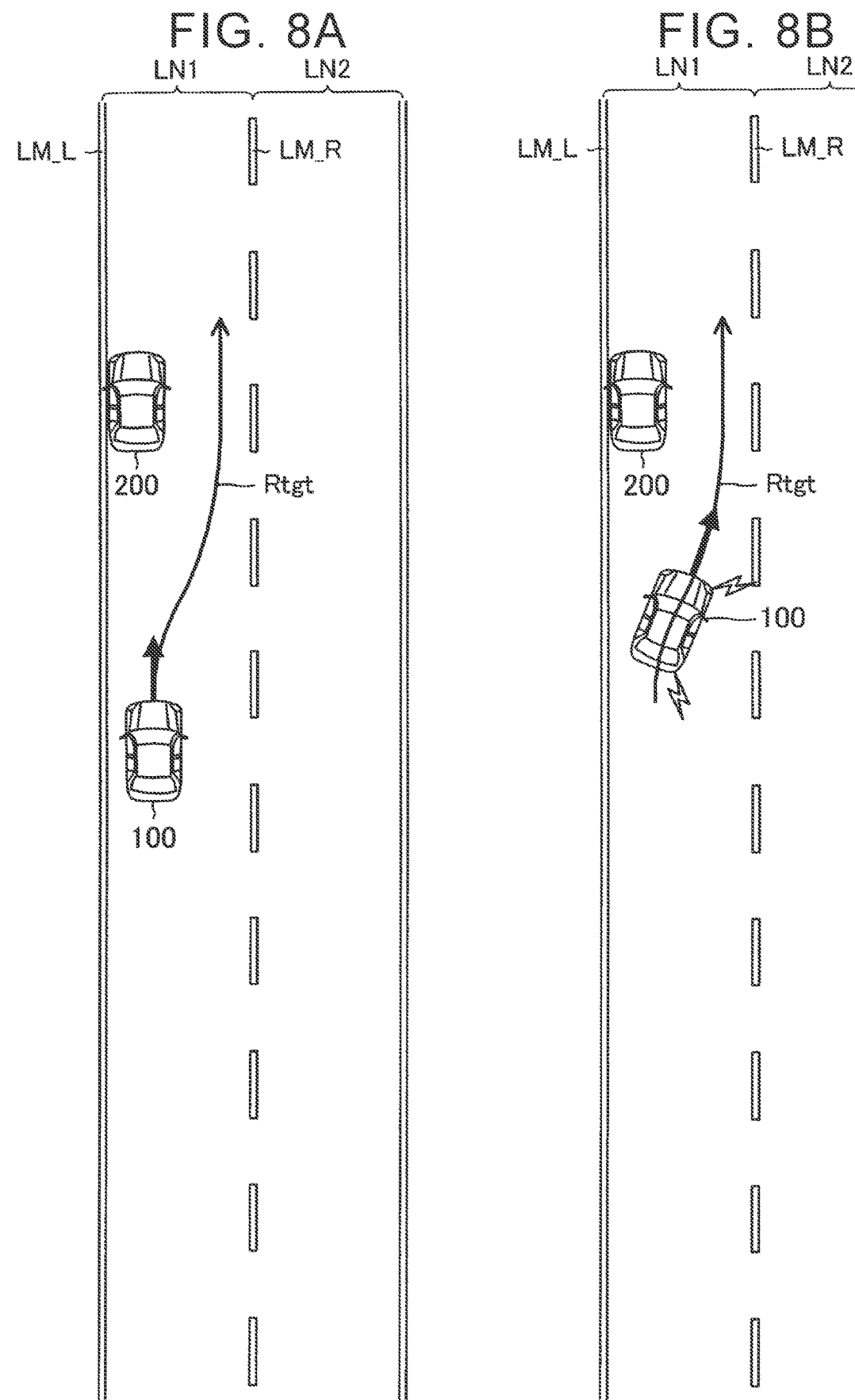

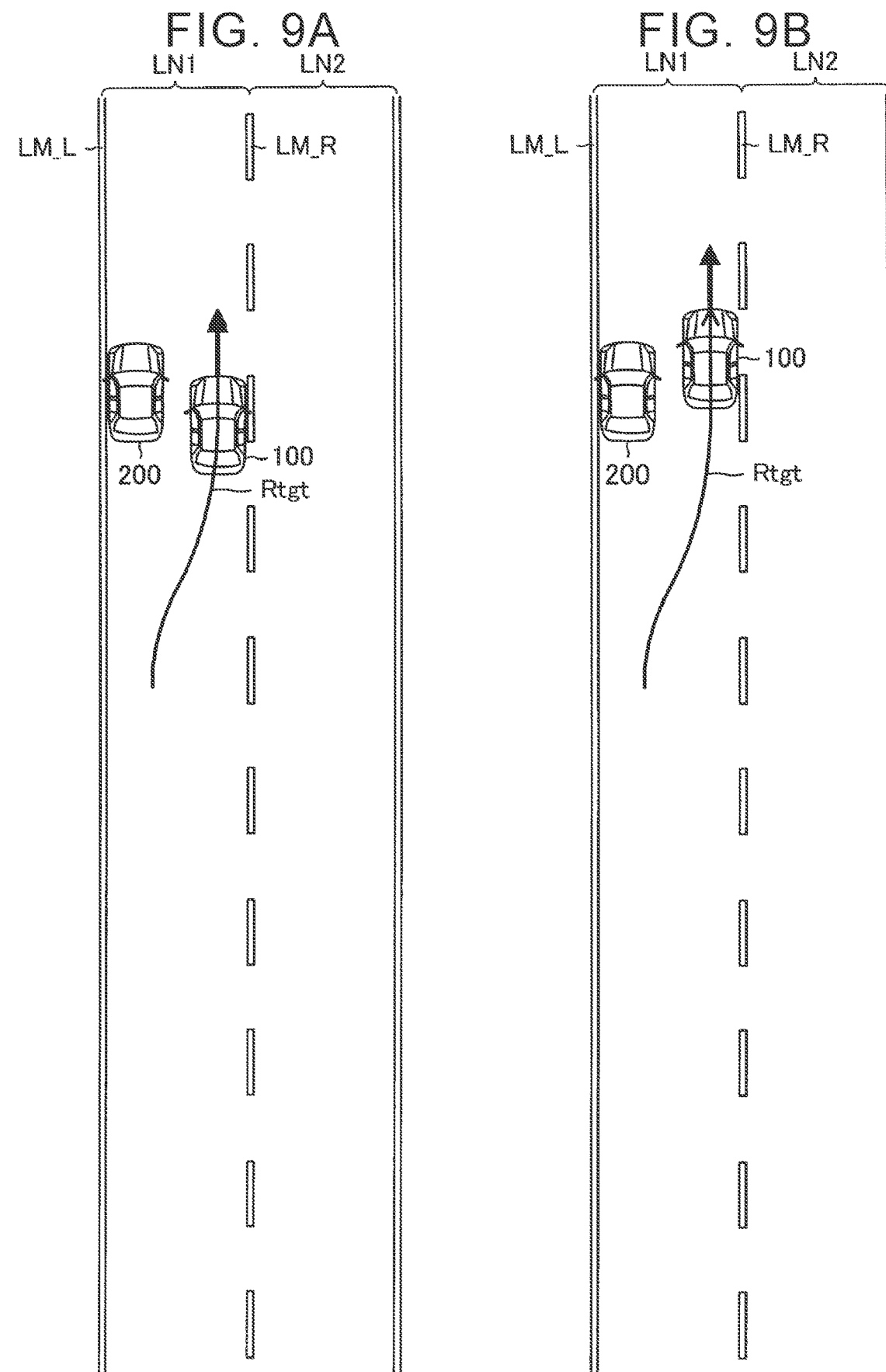

FIG. 16

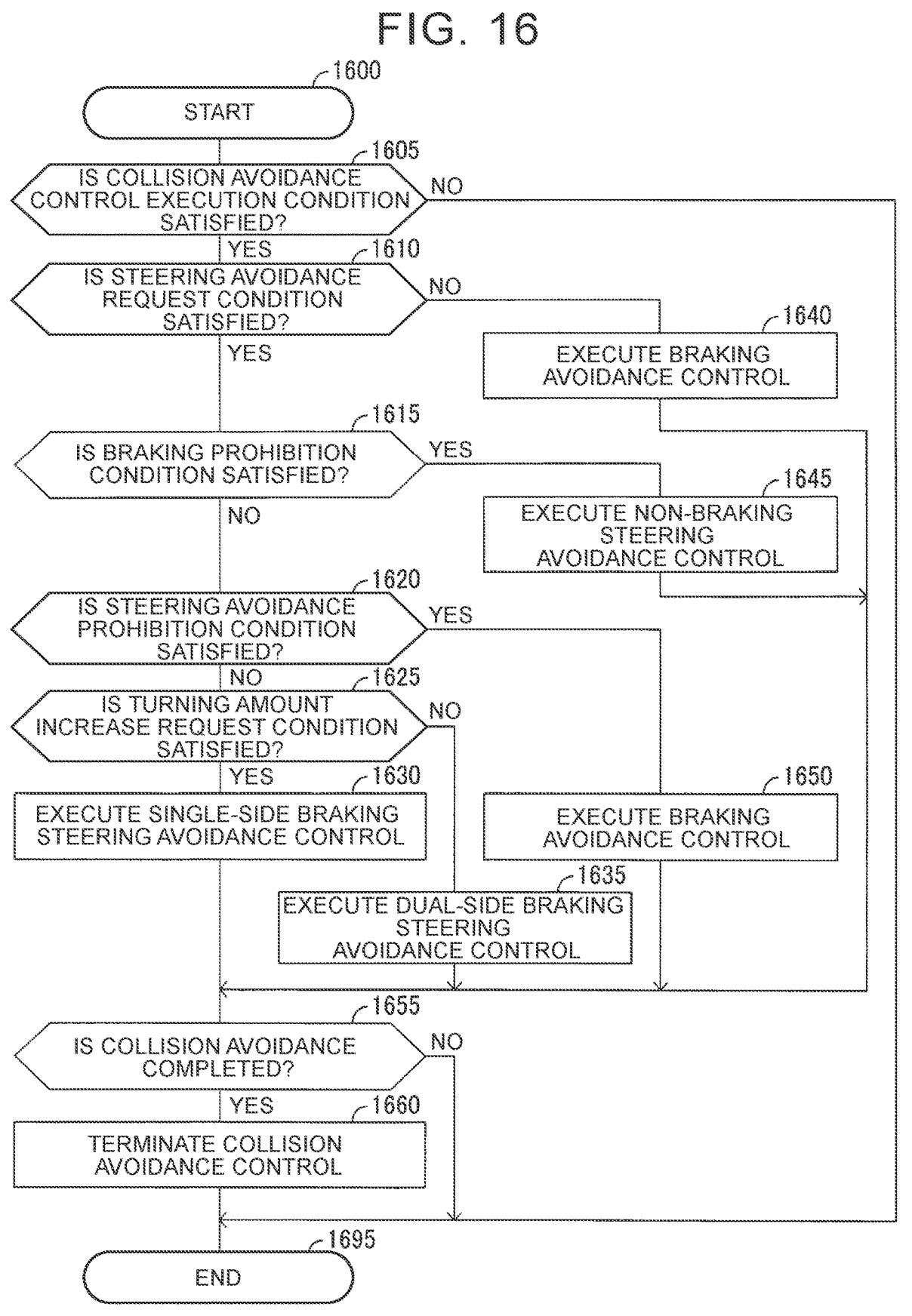

START ⌐1600

IS COLLISION AVOIDANCE CONTROL EXECUTION CONDITION SATISFIED? ⌐1605 — NO

YES ⌐1610

IS STEERING AVOIDANCE REQUEST CONDITION SATISFIED? — NO

EXECUTE BRAKING AVOIDANCE CONTROL ⌐1640

YES

IS BRAKING PROHIBITION CONDITION SATISFIED? ⌐1615 — YES

EXECUTE NON-BRAKING STEERING AVOIDANCE CONTROL ⌐1645

NO

IS STEERING AVOIDANCE PROHIBITION CONDITION SATISFIED? ⌐1620 — YES

NO ⌐1625

IS TURNING AMOUNT INCREASE REQUEST CONDITION SATISFIED? — NO

EXECUTE BRAKING AVOIDANCE CONTROL ⌐1650

YES ⌐1630

EXECUTE SINGLE-SIDE BRAKING STEERING AVOIDANCE CONTROL

EXECUTE DUAL-SIDE BRAKING STEERING AVOIDANCE CONTROL ⌐1635

IS COLLISION AVOIDANCE COMPLETED? ⌐1655 — NO

YES ⌐1660

TERMINATE COLLISION AVOIDANCE CONTROL

END ⌐1695

DRIVING ASSISTANCE DEVICE, DRIVING ASSISTANCE METHOD, AND STORAGE MEDIUM

CROSS-REFERENCE TO RELATED APPLICATION

This application claims priority to Japanese Patent Application No. 2022-048249 filed on Mar. 24, 2022, incorporated herein by reference in its entirety.

BACKGROUND

1. Technical Field

The present disclosure relates to a driving assistance device, a driving assistance method, and a storage medium.

2. Description of Related Art

There is known a driving assistance device that performs collision avoidance braking for avoiding collision between a target vehicle and an object ahead of the target vehicle (forward object) by forcibly decelerating the target vehicle and stopping the target vehicle before the target vehicle reaches the forward object. There is also known a driving assistance device that, when the collision between the target vehicle and the forward object cannot be avoided by the collision avoidance braking, performs collision avoidance steering in addition to the collision avoidance braking to avoid the collision between the target vehicle and the forward object by forcibly turning the target vehicle to swerve around the forward object (see, for example, Japanese Patent No. 5246176 (JP 5246176 B)).

SUMMARY

In the related-art driving assistance device, when the collision between the target vehicle and the forward object cannot be avoided by the collision avoidance braking, the collision avoidance steering is performed in addition to the collision avoidance braking to avoid the collision between the target vehicle and the forward object. In other words, in the related-art driving assistance device, the collision avoidance steering compensates for the insufficiency in the avoidance of the collision between the target vehicle and the forward object by the collision avoidance braking, thereby avoiding the collision between the target vehicle and the forward object.

However, there is a limit to the amount of lateral movement of the target vehicle that can be achieved by the collision avoidance steering. Therefore, the collision between the target vehicle and the forward object cannot be avoided in some cases with the collision avoidance steering used to compensate for the collision avoidance braking.

The present disclosure provides a driving assistance device, a driving assistance method, and a storage medium in which the collision between the target vehicle and the forward object can be avoided more reliably by forcibly decelerating and turning the target vehicle.

A driving assistance device according to a first aspect of the present disclosure includes a control device configured to execute collision avoidance control for avoiding collision between a target vehicle and an object ahead of the target vehicle by forcibly decelerating the target vehicle and forcibly turning the target vehicle to swerve around the object.

In the driving assistance device according to the first aspect of the present disclosure, the control device is configured to execute, as the collision avoidance control, dual-side braking steering avoidance control for forcibly decelerating the target vehicle by applying equal or substantially equal braking forces to wheels on both sides of the target vehicle and forcibly turning the target vehicle to swerve around the object in a case where a turning amount increase request condition that a request is made to increase a turning rate that is a turning amount of the target vehicle relative to an amount of change in a steering angle of the target vehicle when the target vehicle is forcibly turned by the collision avoidance control is not satisfied.

In the driving assistance device according to the first aspect of the present disclosure, the control device is configured to, when forcibly turning the target vehicle rightward by the collision avoidance control to swerve around the object in a case where the turning amount increase request condition is satisfied, execute, as the collision avoidance control, single-side braking steering avoidance control for forcibly decelerating the target vehicle by applying, to a right wheel of the target vehicle, a braking force larger than a braking force applied to a left wheel, and forcibly turning the target vehicle to swerve around the object. The control device is configured to, when forcibly turning the target vehicle leftward by the collision avoidance control to swerve around the object in the case where the turning amount increase request condition is satisfied, execute, as the collision avoidance control, the single-side braking steering avoidance control for forcibly decelerating the target vehicle by applying, to the left wheel of the target vehicle, a braking force larger than a braking force applied to the right wheel, and forcibly turning the target vehicle to swerve around the object.

Accordingly, when forcibly turning the target vehicle to swerve around the object in the case where the request is made to increase the turning rate when the target vehicle is forcibly turned by the collision avoidance control, the target vehicle is forcibly decelerated by applying, to the wheel on the side where the target vehicle is to be turned, the braking force larger than the braking force applied to the wheel on the opposite side. Therefore, the turning rate when the target vehicle is turned increases. Thus, the turning rate can be increased in the case where the request is made to increase the turning rate when the target vehicle is forcibly turned by the collision avoidance control. As a result, the collision between the target vehicle and the forward object can be avoided more reliably.

In the driving assistance device according to the first aspect of the present disclosure, the turning amount increase request condition may be, for example, satisfied when the target vehicle is not expected to swerve around the object by the dual-side braking steering avoidance control.

Accordingly, when forcibly turning the target vehicle to swerve around the object in the case where the target vehicle is not expected to swerve around the object by the dual-side braking steering avoidance control, the target vehicle is forcibly decelerated by applying, to the wheel on the side where the target vehicle is to be turned, the braking force larger than the braking force applied to the wheel on the opposite side. Therefore, the target vehicle may be turned more greatly. Thus, the collision between the target vehicle and the forward object can be avoided more reliably.

In the driving assistance device according to the first aspect of the present disclosure, the turning amount increase request condition may be, for example, satisfied when the turning rate required to swerve the target vehicle around the object is higher than a predetermined turning rate.

Accordingly, when forcibly turning the target vehicle to swerve around the object in the case where the turning rate required to swerve the target vehicle around the object is relatively high, the target vehicle is forcibly decelerated by applying, to the wheel on the side where the target vehicle is to be turned, the braking force larger than the braking force applied to the wheel on the opposite side. Therefore, the target vehicle is turned at a higher turning rate. Thus, the collision between the target vehicle and the forward object can be avoided more reliably.

In the driving assistance device according to the first aspect of the present disclosure, the predetermined turning rate may be, for example, a maximum value of the turning rate that is achievable by the dual-side braking steering avoidance control.

Accordingly, when forcibly turning the target vehicle to swerve around the object in the case where the turning rate required to swerve the target vehicle around the object is higher than the maximum value of the turning rate that is achievable by the dual-side braking steering avoidance control, the target vehicle is forcibly decelerated by applying, to the wheel on the side where the target vehicle is to be turned, the braking force larger than the braking force applied to the wheel on the opposite side. Therefore, the target vehicle is turned at a higher turning rate. Thus, the collision between the target vehicle and the forward object can be avoided more reliably.

In the driving assistance device according to the first aspect of the present disclosure, the turning amount increase request condition may be, for example, satisfied when the turning amount of the target vehicle that is achievable by the dual-side braking steering avoidance control is smaller than the turning amount of the target vehicle that is required to swerve the target vehicle around the object.

Accordingly, when forcibly turning the target vehicle to swerve around the object in the case where the turning amount of the target vehicle that is achievable by the dual-side braking steering avoidance control is smaller than the turning amount of the target vehicle that is required to swerve the target vehicle around the object, the target vehicle is forcibly decelerated by applying, to the wheel on the side where the target vehicle is to be turned, the braking force larger than the braking force applied to the wheel on the opposite side. Therefore, the turning amount of the target vehicle increases. Thus, the collision between the target vehicle and the forward object can be avoided more reliably.

In the driving assistance device according to the first aspect of the present disclosure, the turning amount increase request condition may be, for example, satisfied when a relative speed between the target vehicle and the object is higher than a predetermined speed.

In the case where the relative speed between the target vehicle and the object ahead of the target vehicle is high when the target vehicle is expected to collide with the object, the target vehicle needs to be turned greatly to avoid the collision between the target vehicle and the object more reliably by forcibly turning the target vehicle to swerve around the object. According to the present disclosure, when forcibly turning the target vehicle to swerve around the object in the case where the relative speed between the target vehicle and the object is high, the target vehicle is forcibly decelerated by applying, to the wheel on the side where the target vehicle is to be turned, the braking force larger than the braking force applied to the wheel on the opposite side. Therefore, the target vehicle is turned greatly. Thus, the collision between the target vehicle and the forward object can be avoided more reliably.

In the driving assistance device according to the first aspect of the present disclosure, the turning amount increase request condition may be, for example, satisfied when an overlap rate between the target vehicle and the object is higher than a predetermined value.

In the case where the overlap rate between the target vehicle and the object ahead of the target vehicle is high when the target vehicle is expected to collide with the object, the target vehicle needs to be turned greatly to avoid the collision between the target vehicle and the object more reliably by forcibly turning the target vehicle to swerve around the object. According to the present disclosure, when forcibly turning the target vehicle to swerve around the object in the case where the overlap rate between the target vehicle and the object is high, the target vehicle is forcibly decelerated by applying, to the wheel on the side where the target vehicle is to be turned, the braking force larger than the braking force applied to the wheel on the opposite side. Therefore, the target vehicle is turned greatly. Thus, the collision between the target vehicle and the forward object can be avoided more reliably.

In the driving assistance device according to the first aspect of the present disclosure, the collision avoidance control may include braking avoidance control for avoiding the collision between the target vehicle and the object by forcibly decelerating and stopping the target vehicle without forcibly turning the target vehicle. In this case, the control device may be configured to execute the braking avoidance control in a case where a deceleration of the target vehicle when the braking avoidance control is executed is equal to or lower than a predetermined deceleration, and execute the dual-side braking steering avoidance control or the single-side braking steering avoidance control in a case where the deceleration of the target vehicle when the braking avoidance control is executed is higher than the predetermined deceleration.

Accordingly, in the case where the deceleration of the target vehicle when the braking avoidance control is executed is high, the dual-side braking steering avoidance control or the single-side braking steering avoidance control is executed. Therefore, it is possible to decelerate the target vehicle at a low deceleration and avoid the collision between the target vehicle and the object.

In the driving assistance device according to the first aspect of the present disclosure, the control device may be configured to execute neither the dual-side braking steering avoidance control nor the single-side braking steering avoidance control in a case where the target vehicle has a possibility of colliding with an object other than the object when the dual-side braking steering avoidance control or the single-side braking steering avoidance control is executed.

Accordingly, it is possible to prevent the collision between the target vehicle and the other object due to the execution of the dual-side braking steering avoidance control or the single-side braking steering avoidance control.

A driving assistance method according to a second aspect of the present disclosure is a method for avoiding collision between a target vehicle and an object ahead of the target vehicle by executing collision avoidance control for forcibly decelerating the target vehicle and forcibly turning the target vehicle to swerve around the object.

The driving assistance method according to the second aspect of the present disclosure includes executing, as the collision avoidance control, dual-side braking steering avoidance control for forcibly decelerating the target vehicle by applying equal or substantially equal braking forces to wheels on both sides of the target vehicle and forcibly turning the target vehicle to swerve around the object in a case where a turning amount increase request condition that a request is made to increase a turning rate that is a turning amount of the target vehicle relative to an amount of change in a steering angle of the target vehicle when the target vehicle is forcibly turned by the collision avoidance control is not satisfied, when forcibly turning the target vehicle rightward by the collision avoidance control to swerve around the object in a case where the turning amount increase request condition is satisfied, executing, as the collision avoidance control, single-side braking steering avoidance control for forcibly decelerating the target vehicle by applying, to a right wheel of the target vehicle, a braking force larger than a braking force applied to a left wheel, and forcibly turning the target vehicle to swerve around the object, and when forcibly turning the target vehicle leftward by the collision avoidance control to swerve around the object in the case where the turning amount increase request condition is satisfied, executing, as the collision avoidance control, the single-side braking steering avoidance control for forcibly decelerating the target vehicle by applying, to the left wheel of the target vehicle, a braking force larger than a braking force applied to the right wheel, and forcibly turning the target vehicle to swerve around the object.

Thus, the turning rate can be increased for the same reason as that described above in the case where the request is made to increase the turning rate when the target vehicle is forcibly turned by the collision avoidance control. As a result, the collision between the target vehicle and the forward object can be avoided more reliably.

In a storage medium according to a third aspect of the present disclosure, collision between a target vehicle and an object ahead of the target vehicle is avoided by executing collision avoidance control for forcibly decelerating the target vehicle and forcibly turning the target vehicle to swerve around the object.

The storage medium according to the third aspect of the present disclosure is constructed to execute, as the collision avoidance control, dual-side braking steering avoidance control for forcibly decelerating the target vehicle by applying equal or substantially equal braking forces to wheels on both sides of the target vehicle and forcibly turning the target vehicle to swerve around the object in a case where a turning amount increase request condition that a request is made to increase a turning rate that is a turning amount of the target vehicle relative to an amount of change in a steering angle of the target vehicle when the target vehicle is forcibly turned by the collision avoidance control is not satisfied, when forcibly turning the target vehicle rightward by the collision avoidance control to swerve around the object in a case where the turning amount increase request condition is satisfied, execute, as the collision avoidance control, single-side braking steering avoidance control for forcibly decelerating the target vehicle by applying, to a right wheel of the target vehicle, a braking force larger than a braking force applied to a left wheel, and forcibly turning the target vehicle to swerve around the object, and when forcibly turning the target vehicle leftward by the collision avoidance control to swerve around the object in the case where the turning amount increase request condition is satisfied, execute, as the collision avoidance control, the single-side braking steering avoidance control for forcibly decelerating the target vehicle by applying, to the left wheel of the target vehicle, a braking force larger than a braking force applied to the right wheel, and forcibly turning the target vehicle to swerve around the object.

Thus, the turning rate can be increased for the same reason as that described above in the case where the request is made to increase the turning rate when the target vehicle is forcibly turned by the collision avoidance control. As a result, the collision between the target vehicle and the forward object can be avoided more reliably.

A driving assistance device according to a fourth aspect of the present disclosure is configured to, in a situation in which a target vehicle is expected to collide with an object ahead of the target vehicle, forcibly decelerate the target vehicle and forcibly turn the target vehicle to swerve around the object. The driving assistance device is configured to, in a case where the target vehicle is not expected to be forcibly decelerated by applying equal or substantially equal braking forces to wheels on both sides of the target vehicle and to be forcibly turned to swerve around the object in the situation in which the target vehicle is expected to collide with the object, forcibly decelerate the target vehicle by applying, to a wheel of the target vehicle on a side where the target vehicle is to be forcibly turned, a braking force larger than a braking force applied to a wheel on an opposite side, and forcibly turn the target vehicle to swerve around the object.

In the case where the target vehicle is not expected to be forcibly decelerated by applying the braking forces to the wheels on both sides of the target vehicle and to be forcibly turned to swerve around the object in the situation in which the target vehicle is expected to collide with the object, the turning amount of the target vehicle needs to be increased to avoid the collision between the target vehicle and the object. According to the present disclosure, in such a case, the target vehicle is turned greatly because the target vehicle is forcibly decelerated by applying, to the wheel of the target vehicle on the side where the target vehicle is to be forcibly turned, the braking force larger than the braking force applied to the wheel on the opposite side, and is forcibly turned to swerve around the object. Thus, the collision between the target vehicle and the forward object can be avoided more reliably.

Reference should be made to the drawings for the constituent elements according to the present disclosure, and they are not limited to those according to an embodiment of the present disclosure to be described later. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing a scene in which the target vehicle approaches an object (vehicle) ahead of the target vehicle and a collision avoidance control execution condition is satisfied;

FIG. 8A is a diagram showing a target traveling path set by single-side braking steering avoidance control;

FIG. 8B is a diagram showing a scene in which the target vehicle starts to turn along the target traveling path by the single-side braking steering avoidance control;

FIG. 9A is a diagram showing a scene in which the target vehicle is passing by the object (vehicle) by the single-side braking steering avoidance control;

FIG. 9B is a diagram showing a scene in which the target vehicle has passed by the object (vehicle) and the single-side braking steering avoidance control is terminated;

FIG. 16 is a flowchart showing a routine to be executed by the driving assistance device according to the embodiment of the present disclosure.

DETAILED DESCRIPTION OF EMBODIMENTS

Figure 1:
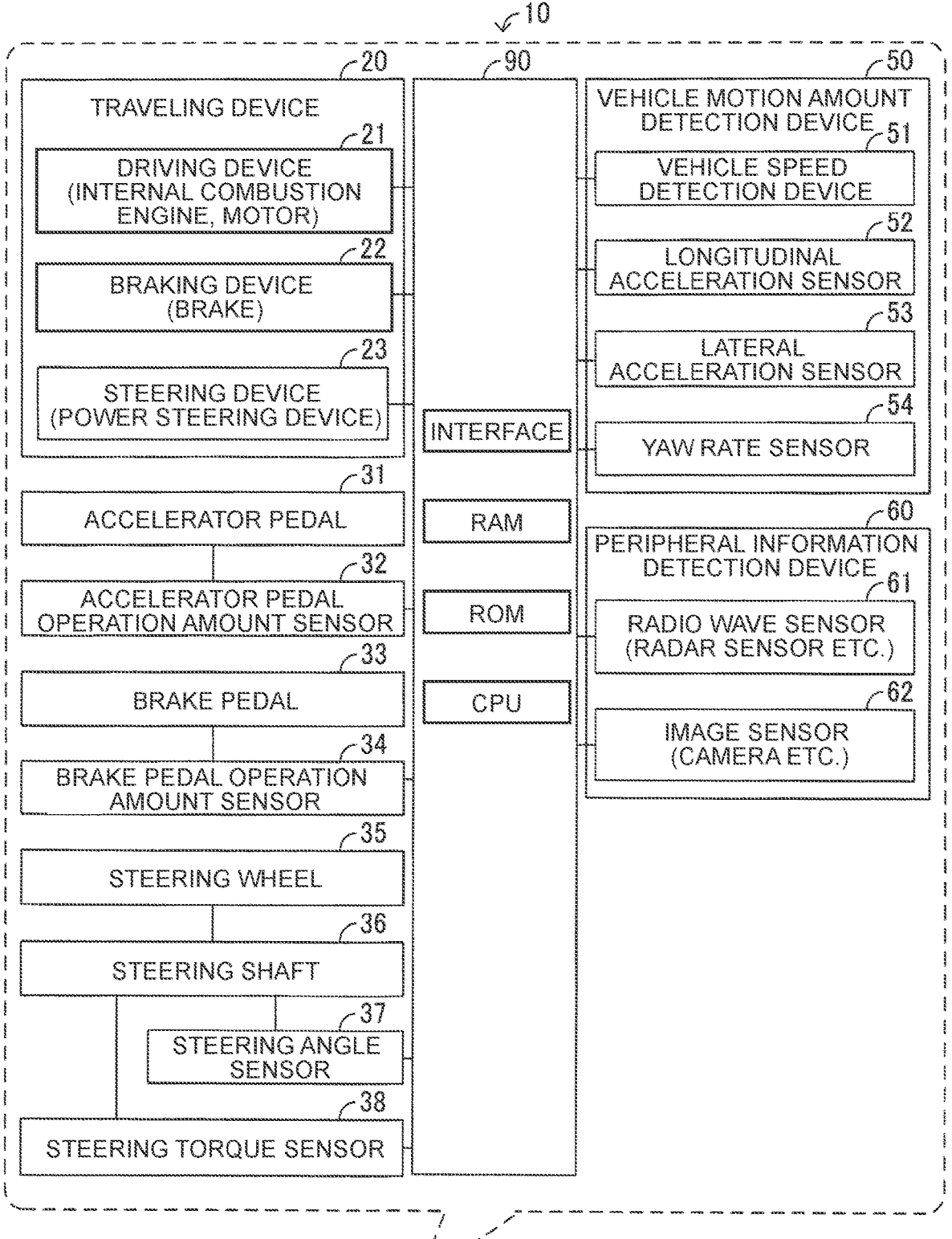
FIG. 1 is a diagram showing a driving assistance device according to an embodiment of the present disclosure and a vehicle (target vehicle) including the driving assistance device.

A driving assistance device according to an embodiment of the present disclosure will be described below with reference to the drawings. As shown in FIG. 1, a driving assistance device 10 according to the embodiment of the present disclosure is mounted on a vehicle (target vehicle 100).

ECU

The driving assistance device 10 includes an ECU 90 as a control device. The term "ECU" is an abbreviation of "electronic control unit". The ECU 90 includes a microcomputer as a main component. The microcomputer includes a central processing unit (CPU), a read only memory (ROM), a random access memory (RAM), a non-volatile memory, and an interface. The CPU executes instructions, programs, or routines stored in the ROM to implement various functions.

Traveling Device

The target vehicle 100 includes a traveling device 20. The traveling device 20 includes a driving device 21, a braking device 22, and a steering device 23.

Driving Device

The driving device 21 outputs a driving torque (driving force) to be applied to the target vehicle 100 to cause the target vehicle 100 to travel, and is typified by an internal combustion engine or a motor. The driving device 21 is electrically connected to the ECU 90. The ECU 90 can control the driving torque to be output from the driving device 21 by controlling operation of the driving device 21.

Braking Device

The braking device 22 outputs a braking torque (braking force) to be applied to the target vehicle 100 to brake the target vehicle 100, and is typified by a brake. The braking device 22 is electrically connected to the ECU 90. The ECU 90 can control the braking torque to be output from the braking device 22, that is, the braking torque to be applied to each wheel of the target vehicle 100 by the braking device 22, by controlling operation of the braking device 22. In this example, the braking device 22 can individually control the braking torques to be applied to the wheels of the target vehicle 100.

Steering Device

The steering device 23 outputs a steering torque (steering force) to be applied to the target vehicle 100 to steer the target vehicle 100, and is typified by a power steering device. The steering device 23 is electrically connected to the ECU 90. The ECU 90 can control the steering torque to be output from the steering device 23, that is, the steering torque to be applied to the target vehicle 100 by the steering device 23, by controlling operation of the steering device 23.

Sensors and Other Devices

The target vehicle 100 further includes an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle motion amount detection device 50, and a peripheral information detection device 60.

Accelerator Pedal Operation Amount Sensor

The accelerator pedal operation amount sensor 32 detects an operation amount of the accelerator pedal 31. The accelerator pedal operation amount sensor 32 is electrically connected to the ECU 90. The accelerator pedal operation amount sensor 32 transmits information on the detected operation amount of the accelerator pedal 31 to the ECU 90. The ECU 90 acquires the operation amount of the accelerator pedal 31 as an accelerator pedal operation amount AP based on the information.

The ECU 90 acquires a requested driving force (requested driving torque) by calculation based on the accelerator pedal operation amount AP and a traveling speed of the target vehicle 100. The requested driving force is a driving force requested to be output from the driving device 21. The ECU 90 controls the operation of the driving device 21 to output the requested driving force except when braking avoidance control, single-side braking steering avoidance control, and dual-side braking steering avoidance control to be described later are executed.

Brake Pedal Operation Amount Sensor

The brake pedal operation amount sensor 34 detects an operation amount of the brake pedal 33. The brake pedal operation amount sensor 34 is electrically connected to the ECU 90. The brake pedal operation amount sensor 34 transmits information on the detected operation amount of the brake pedal 33 to the ECU 90. The ECU 90 acquires the operation amount of the brake pedal 33 as a brake pedal operation amount BP based on the information.

The ECU 90 acquires a requested braking force (requested braking torque) by calculation based on the brake pedal operation amount BP. The requested braking force is a braking force requested to be output from the braking device 22. The ECU 90 controls the operation of the braking device 22 to output the requested braking force except when the braking avoidance control, the single-side braking steering avoidance control, and the dual-side braking steering avoidance control to be described later are executed.

Steering Angle Sensor

The steering angle sensor 37 detects a rotation angle of the steering shaft 36 with respect to a neutral position. The steering angle sensor 37 is electrically connected to the ECU 90. The steering angle sensor 37 transmits information on the detected rotation angle of the steering shaft 36 to the ECU 90. The ECU 90 acquires the rotation angle of the steering shaft 36 as a steering angle θ based on the information.

Steering Torque Sensor

The steering torque sensor 38 detects a torque input to the steering shaft 36 by the driver via the steering wheel 35. The steering torque sensor 38 is electrically connected to the ECU 90. The steering torque sensor 38 transmits information on the detected torque to the ECU 90. The ECU 90 acquires the torque input to the steering shaft 36 by the driver via the steering wheel 35 (driver input torque) based on the information.

Vehicle Motion Amount Detection Device

The vehicle motion amount detection device 50 detects a motion amount of the target vehicle 100, and includes a vehicle speed detection device 51, a longitudinal acceleration sensor 52, a lateral acceleration sensor 53, and a yaw rate sensor 54 in this example.

Vehicle Speed Detection Device

The vehicle speed detection device 51 detects a traveling speed of the target vehicle 100, and is typified by a wheel speed sensor. The vehicle speed detection device 51 is electrically connected to the ECU 90. The vehicle speed detection device 51 transmits information on the detected vehicle speed of the target vehicle 100 to the ECU 90. The ECU 90 acquires the traveling speed of the target vehicle 100 (target-vehicle speed V100) based on the information.

The ECU 90 acquires a requested steering force (requested steering torque) by calculation based on the acquired steering angle θ, the acquired driver input torque, and the acquired target-vehicle speed V100. The requested steering force is a steering force requested to be output from the steering device 23. The ECU 90 controls the operation of the steering device 23 to output the requested steering force from the steering device 23 except when the single-side braking steering avoidance control and the dual-side braking steering avoidance control to be described later are executed.

Longitudinal Acceleration Sensor

The longitudinal acceleration sensor 52 detects an acceleration of the target vehicle 100 in a fore-and-aft direction. The longitudinal acceleration sensor 52 is electrically connected to the ECU 90. The longitudinal acceleration sensor 52 transmits information on the detected acceleration to the ECU 90. The ECU 90 acquires the acceleration of the target vehicle 100 in the fore-and-aft direction as a longitudinal acceleration Gx based on the information.

Lateral Acceleration Sensor

The lateral acceleration sensor 53 detects an acceleration of the target vehicle 100 in a lateral direction (width direction). The lateral acceleration sensor 53 is electrically connected to the ECU 90. The lateral acceleration sensor 53 transmits information on the detected acceleration to the ECU 90. The ECU 90 acquires the acceleration of the target vehicle 100 in the lateral direction as a lateral acceleration Gy based on the information.

Yaw Rate Sensor

The yaw rate sensor 54 detects a yaw rate YR of the target vehicle 100. The yaw rate sensor 54 is electrically connected to the ECU 90. The yaw rate sensor 54 transmits information on the detected yaw rate YR to the ECU 90. The ECU 90 acquires the yaw rate YR of the target vehicle 100 based on the information.

An inertial measurement unit (IMU) in which the longitudinal acceleration sensor 52, the lateral acceleration sensor 53, and the yaw rate sensor 54 are integrated into a unit may be used in place of the longitudinal acceleration sensor 52, the lateral acceleration sensor 53, and the yaw rate sensor 54.

Peripheral Information Detection Device

The peripheral information detection device 60 detects information on an area around the target vehicle 100, and includes a radio wave sensor 61 and an image sensor 62 in this example. Examples of the radio wave sensor 61 include a radar sensor (such as a millimeter wave radar). Examples of the image sensor 62 include a camera. The peripheral information detection device 60 may include an acoustic wave sensor such as an ultrasonic sensor (clearance sonar), an optical sensor such as a laser radar (light detection and ranging (LiDAR)), or a time of flight sensor (ToF sensor).

Radio Wave Sensor

The radio wave sensor 61 is electrically connected to the ECU 90. The radio wave sensor 61 emits a radio wave, and receives the radio wave reflected by an object (reflected wave). The radio wave sensor 61 transmits information (detection result) related to the emitted radio wave and the received radio wave (reflected wave) to the ECU 90. In other words, the radio wave sensor 61 detects an object present around the target vehicle 100, and transmits information (detection result) related to the detected object to the ECU 90. The ECU 90 can acquire information related to the object present around the target vehicle 100 (peripheral detection information ID) based on the information (radio wave information).

In this example, the object is a vehicle, a motorcycle, a bicycle, a person, or the like.

Image Sensor

The image sensor 62 is electrically connected to the ECU 90. The image sensor 62 captures an image of an area around the target vehicle 100, and transmits information related to the captured image to the ECU 90. The ECU 90 can acquire information related to the area around the target vehicle 100 (peripheral detection information ID) based on the information (image information).

Figure 2:
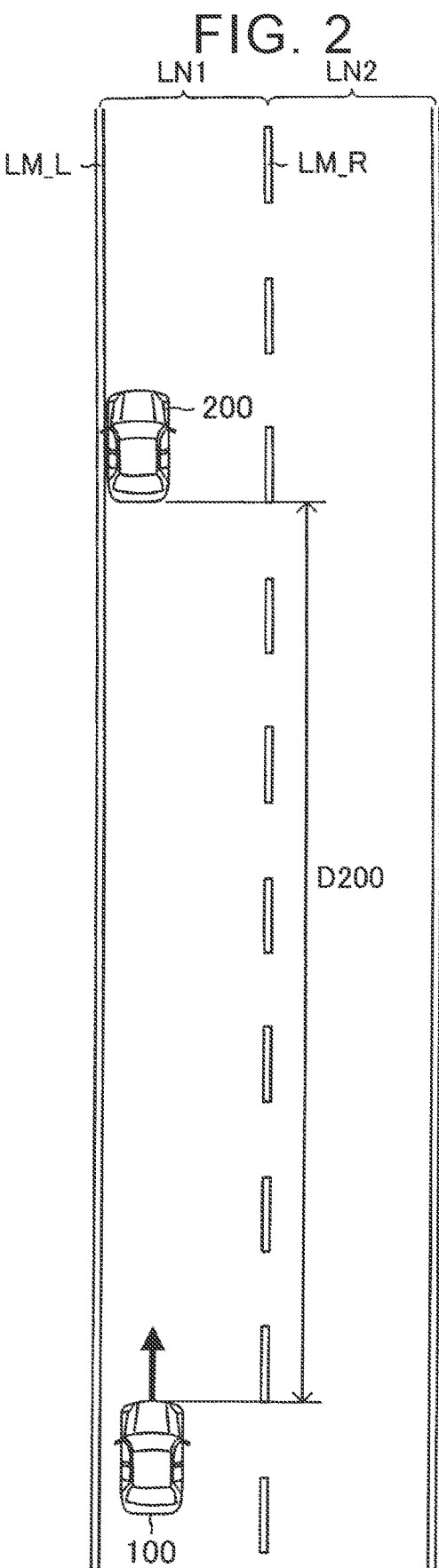
FIG. 2 is a diagram showing, for example, a distance between the target vehicle and an object (vehicle) ahead of the target vehicle.

When an object (forward object 200) is present ahead of the target vehicle 100 as shown in FIG. 2, the ECU 90 detects the forward object 200 based on the peripheral detection information ID. The forward object 200 is a vehicle, a motorcycle, a bicycle, a person, or the like. In the example shown in FIG. 2, the forward object 200 is a vehicle.

When the ECU 90 detects the forward object 200, the ECU 90 can acquire, for example, "a distance between the forward object 200 and the target vehicle 100 (object distance D200)" and "a speed of the target vehicle 100 relative to the forward object 200 (relative speed ΔV200)" based on the peripheral detection information ID.

The ECU 90 recognizes "a right lane marking line LM_R and a left lane marking line LM_L defining a traveling lane of the target vehicle 100 (target-vehicle lane LN1)" based on the peripheral detection information ID. The ECU 90 can determine a range of the target-vehicle lane LN1 based on the recognized right and left lane marking lines LM (that is, the right lane marking line LM_R and the left lane marking line LM_L). In FIG. 2, reference symbol LN2 represents an oncoming lane for the target-vehicle lane LN1.

Outline of Operation of Driving Assistance Device

Next, an outline of operation of the driving assistance device 10 will be described.

Normal Traveling Control

While the target vehicle 100 is traveling, the driving assistance device 10 performs a process for detecting an object such as a vehicle ahead of the target vehicle 100 in the traveling direction based on the peripheral detection information ID. The driving assistance device 10 executes normal traveling control while the driving assistance device 10 does not detect an object ahead of the target vehicle 100 in the traveling direction.

In the normal traveling control, when the requested driving force is larger than zero, the operation of the driving device 21 is controlled to output the requested driving force from the driving device 21. When the requested braking force is larger than zero, the operation of the braking device 22 is controlled to output the requested braking force from the braking device 22. When the requested steering force is larger than zero, the operation of the steering device 23 is controlled to output the requested steering force from the steering device 23.

When the driving assistance device 10 detects an object ahead of the target vehicle 100 in the traveling direction, the driving assistance device 10 determines whether the object (forward object 200) is present in a predicted traveling area A100. This determination is made based on the peripheral detection information ID.

Figures 3A, 3B:
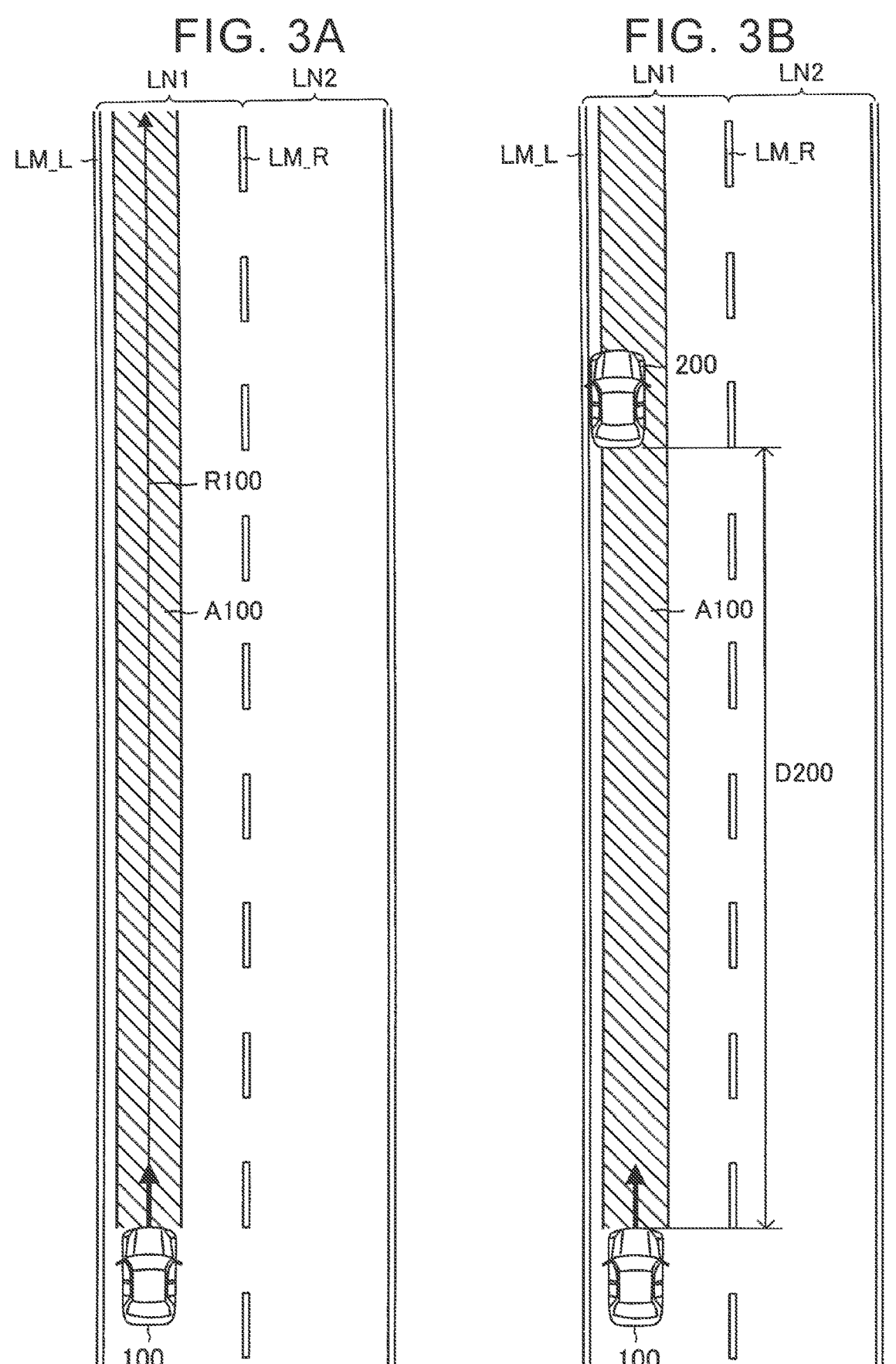
FIG. 3A is a diagram showing a predicted traveling area of the target vehicle.
FIG. 3B is a diagram showing a scene in which an object (vehicle) is present in the predicted traveling area of the target vehicle.

As shown in FIG. 3A, the predicted traveling area A100 is an area having a width equal to the width of the target vehicle 100 with its center corresponding to a predicted traveling path R100 of the target vehicle 100. The predicted traveling path R100 is a traveling path where the target vehicle 100 is predicted to travel in the future when the target vehicle 100 travels while keeping the steering angle θ at that time. The predicted traveling path R100 shown in FIG. 3A is a straight line, but may be a curved line depending on situations.

When the detected forward object 200 is not present in the predicted traveling area A100, the driving assistance device 10 continues the normal traveling control.

When determination is made that the detected forward object 200 is present in the predicted traveling area A100 as shown in FIG. 3B, the driving assistance device 10 acquires a predicted period to reach TTC. The predicted period to reach TTC is a predicted period required for the target vehicle 100 to reach the forward object 200. The driving assistance device 10 acquires the predicted period to reach TTC by dividing the object distance D200 by the relative speed ΔV200 (TTC=D200/ΔV200). The driving assistance device 10 acquires the object distance D200, the relative speed ΔV200, and the predicted period to reach TTC in a predetermined calculation cycle while determining that the forward object 200 is present in the predicted traveling area A100.

The predicted period to reach TTC decreases as the target vehicle 100 approaches the forward object 200 when the relative speed ΔV200 is constant. Therefore, the predicted period to reach TTC is an index value indicating the possibility that the target vehicle 100 will not collide with the forward object 200. The index value decreases as the predicted period to reach TTC decreases and the possibility that the target vehicle 100 will not collide with the forward object 200 decreases.

The driving assistance device 10 determines whether the predicted period to reach TTC has decreased to a predetermined period (collision determination period TTCth). The driving assistance device 10 continues the normal traveling control while the predicted period to reach TTC is longer than the collision determination period TTCth.

Figure 4:
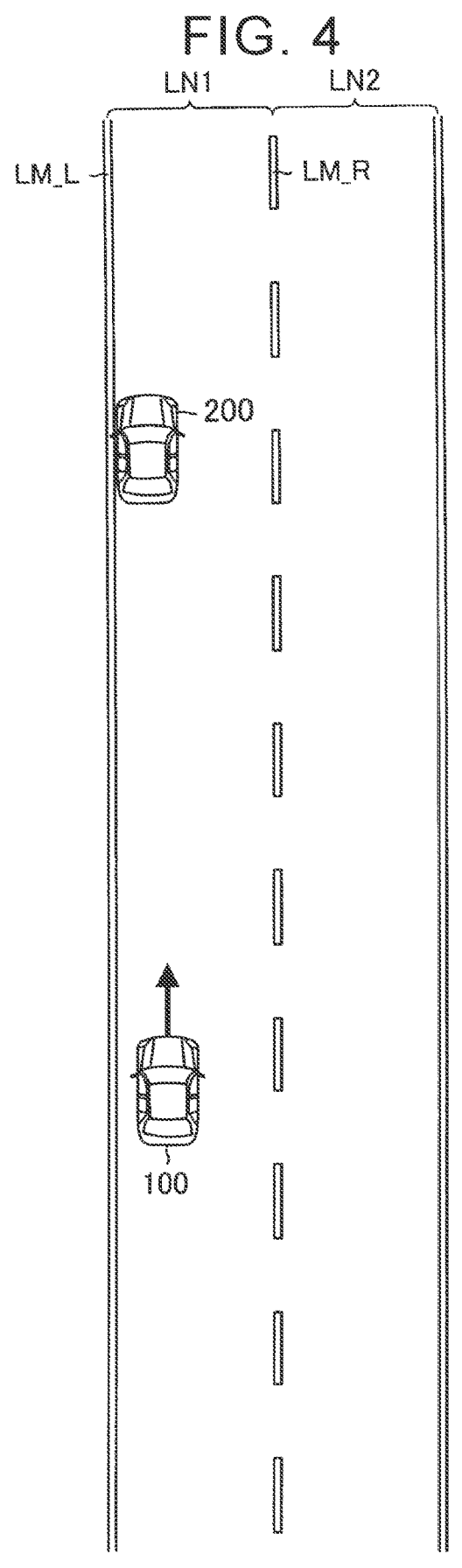

As shown in FIG. 4, when the target vehicle 100 approaches the forward object 200 and the predicted period to reach TTC decreases to the collision determination period TTCth while the driver of the target vehicle 100 does not perform a collision avoidance steering wheel operation (operation on the steering wheel 35 to avoid collision between the target vehicle 100 and the forward object 200), the driving assistance device 10 determines that the target vehicle 100 may collide with the forward object 200 if the target vehicle 100 continues to travel in that state. When determination is made that the target vehicle 100 may collide with the forward object 200, the driving assistance device 10 determines that a collision avoidance control execution condition is satisfied.

Collision Avoidance Control

When determination is made that the collision avoidance control execution condition is satisfied, the driving assistance device 10 executes collision avoidance control for avoiding the collision between the target vehicle 100 and the forward object 200. In this example, the collision avoidance control includes two types of control that are braking avoidance control and steering avoidance control. When determination is made that the collision avoidance control execution condition is satisfied, the driving assistance device 10 executes the braking avoidance control or the steering avoidance control to avoid the collision between the target vehicle 100 and the forward object 200.

In this example, the braking avoidance control is control for forcibly decelerating the target vehicle 100 and stopping the target vehicle 100 behind the forward object 200. The steering avoidance control is control for forcibly turning the target vehicle 100 to swerve around the forward object 200. More specifically, the steering avoidance control is control for forcibly turning the target vehicle 100 to pass by the forward object 200 and forcibly decelerating the target vehicle 100 as necessary.

The "forcible deceleration" does not refer to deceleration caused by the driver of the target vehicle 100 operating the brake pedal of the target vehicle 100, but refers to automatic stop of the target vehicle 100 under control of the driving assistance device 10 regardless of the driver's intention. The "forcible turning" does not refer to turning caused by the driver of the target vehicle 100 operating the steering wheel of the target vehicle 100, but refers to automatic turning of the target vehicle 100 under control of the driving assistance device 10 regardless of the driver's intention.

The driving assistance device 10 executes the braking avoidance control when a steering avoidance request condition is not satisfied, and executes the steering avoidance control when the steering avoidance request condition is satisfied.

The steering avoidance request condition is set, for example, to a condition that the deceleration of the target vehicle 100 when the braking avoidance control is executed is higher than a predetermined deceleration. In this case, the predetermined deceleration may be, for example, the maximum value of the deceleration of the target vehicle 100 that can be realized by the braking device 22, or an upper limit deceleration of the target vehicle 100 that can ensure the safety of occupants of the target vehicle 100 including the driver.

Alternatively, the steering avoidance request condition is set, for example, to a condition that the braking force applied to the target vehicle 100 when the braking avoidance control is executed is larger than a predetermined braking force. In this case, the predetermined braking force may be, for example, the maximum value of the braking force that can be applied to the target vehicle 100 by the braking device 22, or an upper limit braking force that can ensure the safety of occupants of the target vehicle 100 including the driver when the braking force is applied to the target vehicle 100.

In this example, however, the steering avoidance request condition is set to the following conditions.

Figure 5:
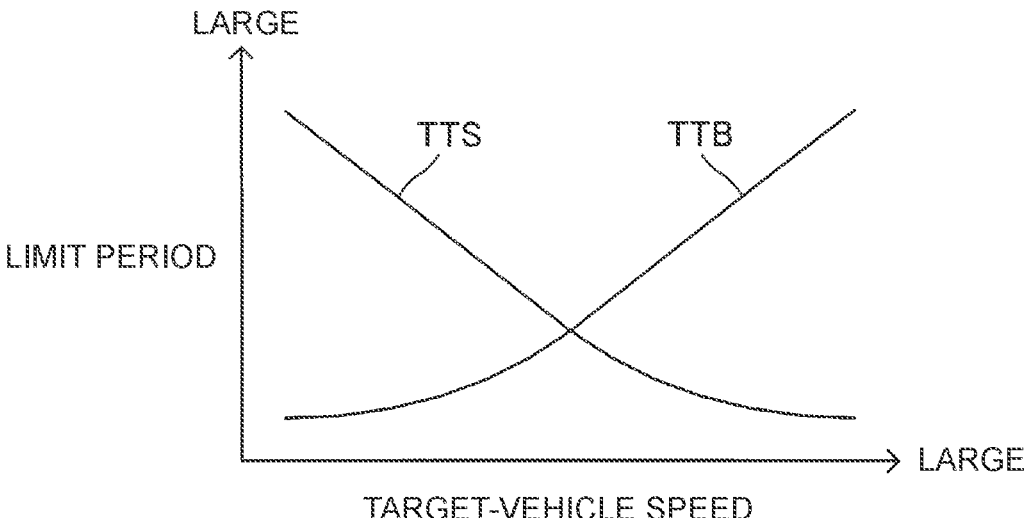
FIG. 5 is a diagram showing a relationship between a target-vehicle speed and each of a braking avoidance limit period and a steering avoidance limit period.

The minimum predicted period to reach TTC with which the collision between the target vehicle 100 and the forward object 200 can be avoided by the braking avoidance control (braking avoidance limit period TTC_B) increases as the target-vehicle speed V100 increases as indicated by a line TTB in FIG. 5. The minimum predicted period to reach TTC with which the collision between the target vehicle 100 and the forward object 200 can be avoided by the steering avoidance control not involving deceleration of the target vehicle 100 (steering avoidance limit period TTC_S) decreases as the target-vehicle speed V100 increases as indicated by a line TTS in FIG. 5. The line TTB (indicating the relationship between the braking avoidance limit period TTC_B and the target-vehicle speed V100) and the line TTS (indicating the relationship between the steering avoidance limit period TTC_S and the target-vehicle speed V100) intersect each other at a certain vehicle speed Vth. Therefore, the magnitude relationship between the braking avoidance limit period TTC_B and the steering avoidance limit period TTC_S is reversed at the certain vehicle speed Vth. Specifically, the braking avoidance limit period TTC_B is shorter than the steering avoidance limit period TTC_S when the target-vehicle speed V100 is lower than the certain vehicle speed Vth, and the steering avoidance limit period TTC_S is shorter than the braking avoidance limit period TTC_B when the target-vehicle speed V100 is higher than the certain vehicle speed Vth.

This means that, when the target-vehicle speed V100 is relatively low, the collision avoidance control can be started at a later timing in the avoidance of the collision between the target vehicle 100 and the forward object 200 by the braking avoidance control than in the avoidance of the collision between the target vehicle 100 and the forward object 200 by the steering avoidance control. This also means that, when the target-vehicle speed V100 is relatively high, the collision avoidance control can be started at a later timing in the avoidance of the collision between the target vehicle 100 and the forward object 200 by the steering avoidance control than in the avoidance of the collision between the target vehicle 100 and the forward object 200 by the braking avoidance control.

When the braking avoidance control or the steering avoidance control is started, some drivers feel that the start timing of the braking avoidance control or the steering avoidance control is too early. Therefore, in some embodiments, even if the braking avoidance control or the steering avoidance control is started, it may be started as late a timing as possible.

As described above, the driving assistance device 10 sets the braking avoidance limit period TTC_B or the steering avoidance limit period TTC_S as the collision determination period TTCth depending on the target-vehicle speed V100. Specifically, the driving assistance device 10 sets the braking avoidance limit period TTC_B as the collision determination period TTCth when the target-vehicle speed V100 is lower than the certain vehicle speed Vth (predetermined vehicle speed Vth), and sets the steering avoidance limit period TTC_S as the collision determination period TTCth when the target-vehicle speed V100 is higher than the predetermined vehicle speed Vth. When the target-vehicle speed V100 is equal to the predetermined vehicle speed Vth, any of the braking avoidance limit period TTC_B and the steering avoidance limit period TTC_S may be set as the collision determination period TTCth. In this example, the driving assistance device 10 sets the braking avoidance limit period TTC_B as the collision determination period TTCth.

When the current target-vehicle speed V100 is higher than the predetermined vehicle speed Vth, the driving assistance device 10 determines that the steering avoidance request condition is satisfied. Alternatively, when the steering avoidance limit period TTC_S associated with the current target-vehicle speed V100 is shorter than the braking avoidance limit period TTC_B associated with the current target-vehicle speed V100, the driving assistance device 10 determines that the steering avoidance request condition is satisfied.

That is, in this example, the steering avoidance request condition is the condition that the current target-vehicle speed V100 is higher than the predetermined vehicle speed Vth, or that the steering avoidance limit period TTC_S associated with the current target-vehicle speed V100 is shorter than the braking avoidance limit period TTC_B associated with the current target-vehicle speed V100.

Braking Avoidance Control

Figure 6A:
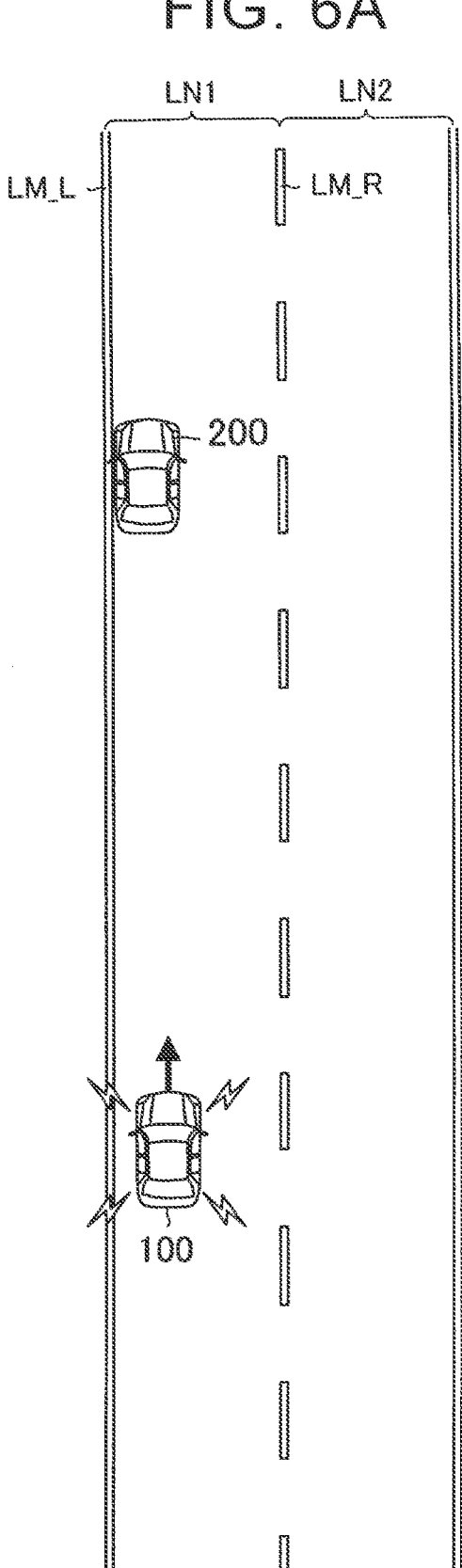
FIG. 6A is a diagram showing a scene in which a braking force is applied to the target vehicle by braking avoidance control.
Figure 6B:
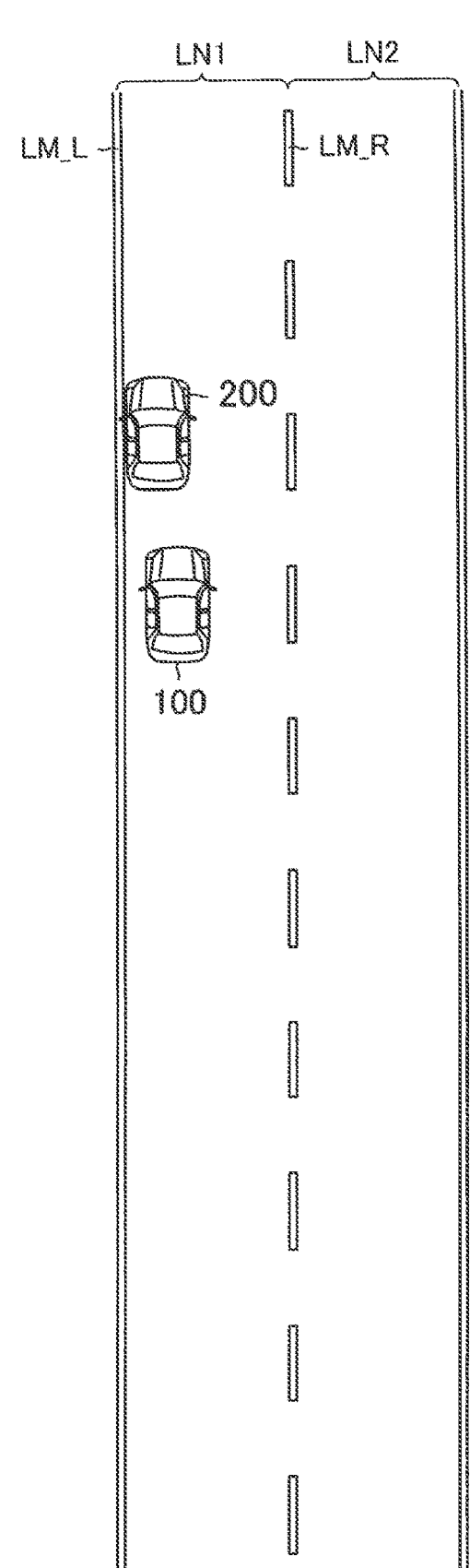
FIG. 6B is a diagram showing a scene in which the target vehicle is stopped by the braking avoidance control.

When the steering avoidance request condition is not satisfied, the driving assistance device 10 starts the braking avoidance control to forcibly apply the braking force to the target vehicle 100 as shown in FIG. 6A. As a result, the target vehicle 100 is stopped behind the forward object 200 as shown in FIG. 6B.

Accordingly, the collision between the target vehicle 100 and the forward object 200 can be avoided.

When the steering avoidance request condition is satisfied, the driving assistance device 10 determines whether a turning amount increase request condition is satisfied.

Turning Amount Increase Request Condition

Figure 7:
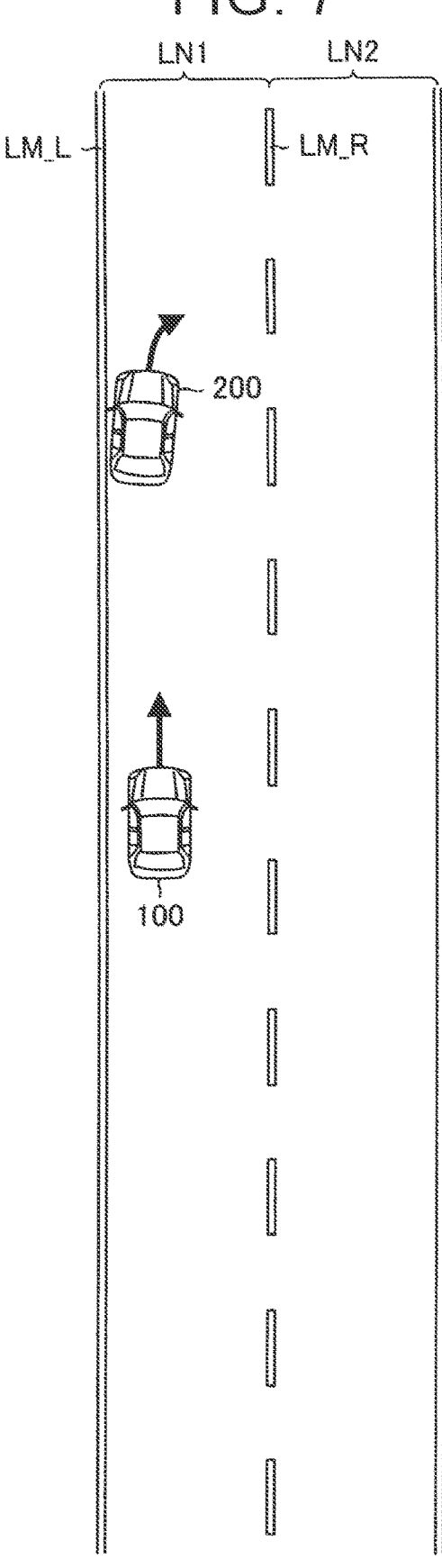
FIG. 7 is a diagram showing a scene in which the target vehicle approaches an object (vehicle) ahead of the target vehicle and a collision avoidance control execution condition is satisfied.

For example, as shown in FIG. 7, there is a space for the target vehicle 100 to travel on the right side of the forward object 200 when the collision avoidance control execution condition is satisfied. Therefore, an attempt is made to avoid the collision between the target vehicle 100 and the forward object 200 by causing the target vehicle 100 to pass along the space on the right side of the forward object 200. When the forward object 200 starts to move rightward, the target vehicle 100 may fail to avoid the collision with the forward object 200 unless the target vehicle 100 turns rightward greatly.

In such a case, in some embodiments, the turning amount of the target vehicle 100 may be increased (turning rate of the target vehicle 100) relative to the amount of change in the steering angle of the target vehicle 100 when the target vehicle 100 is forcibly turned by the collision avoidance control.

In this example, the turning amount increase request condition is a condition that a request is made to increase the turning amount of the target vehicle 100 (turning rate of the target vehicle 100) relative to the amount of change in the steering angle of the target vehicle 100 when the target vehicle 100 is forcibly turned by the collision avoidance control. In particular, the turning amount increase request condition is a condition that the target vehicle 100 cannot swerve around the forward object 200 by the dual-side braking steering avoidance control to be described later.

In this example, the turning amount increase request condition is set to a condition that the turning rate of the target vehicle 100 required to swerve the target vehicle 100 around the forward object 200 is higher than a predetermined turning rate. In this example, the predetermined turning rate is set to the maximum value of the turning rate of the target vehicle 100 that can be achieved by the dual-side braking steering avoidance control to be described later.

The turning amount increase request condition may be set to a condition that the turning amount of the target vehicle 100 that can be achieved by the dual-side braking steering avoidance control to be described later is smaller than the turning amount of the target vehicle 100 required to swerve the target vehicle 100 around the forward object 200, a condition that the relative speed $\Delta V200$ between the target vehicle 100 and the forward object 200 is higher than a predetermined speed, or a condition that the overlap rate between the target vehicle 100 and the forward object 200 is higher than a predetermined value. The overlap rate between the target vehicle 100 and the forward object 200 is a value indicating a rate of overlap between the width of the target vehicle 100 and the width of the forward object 200 with respect to the width of the target vehicle 100.

Alternatively, the turning amount increase request condition may be set to a condition that the forward object 200 starts to move rightward when causing the target vehicle 100 to travel while turning rightward to pass on the right side of the forward object 200 by the collision avoidance control, or a condition that the forward object 200 starts to move leftward when causing the target vehicle 100 to travel while turning leftward to pass on the left side of the forward object 200 by the collision avoidance control. The determination as to whether the forward object 200 has started to move rightward and the determination as to whether the forward object 200 has started to move leftward are made based on the peripheral detection information ID.

Steering Avoidance Control

In this example, the steering avoidance control includes two types of control that are the dual-side braking steering avoidance control and the single-side braking steering avoidance control.

Dual-Side Braking Steering Avoidance Control

The dual-side braking steering avoidance control is control for forcibly decelerating the target vehicle 100 by applying equal or substantially equal braking forces (the difference falls within a range smaller than a predetermined value) to the wheels on both sides of the target vehicle 100 and forcibly turning the target vehicle 100 to swerve around the forward object 200.

In particular, the dual-side braking steering avoidance control in this example is control for forcibly decelerating the target vehicle 100 by applying equal braking forces to both the right and left wheels of the target vehicle 100 and forcibly turning the target vehicle 100 by applying a steering force to the target vehicle 100 to swerve around the forward object 200. In particular, the dual-side braking steering avoidance control is control for forcibly decelerating the target vehicle 100 by applying equal braking forces to both the right and left wheels of the target vehicle 100 and forcibly turning the target vehicle 100 by applying a steering force to the target vehicle 100 to pass by the forward object 200.

Single-Side Braking Steering Avoidance Control

The single-side braking steering avoidance control is control for forcibly decelerating the target vehicle 100 by applying, to the wheels of the target vehicle 100 on a side where the target vehicle 100 is to be forcibly turned, braking forces larger than those applied to the wheels on the opposite side, and forcibly turning the target vehicle 100 to swerve around the forward object 200. That is, when forcibly turning the target vehicle 100 rightward to swerve around the forward object 200, the single-side braking steering avoidance control is control for forcibly decelerating the target vehicle 100 by applying, to the right wheels of the target vehicle 100, braking forces larger than those applied to the left wheels (or braking forces equal to or larger than a predetermined value), and forcibly turning the target vehicle 100 to swerve around the forward object 200. When forcibly turning the target vehicle 100 leftward to swerve around the forward object 200, the single-side braking steering avoidance control is control for forcibly decelerating the target vehicle 100 by applying, to the left wheels of the target vehicle 100, braking forces larger than those applied to the right wheels (or braking forces equal to or larger than the predetermined value), and forcibly turning the target vehicle 100 to swerve around the forward object 200.

In particular, the single-side braking steering avoidance control in this example is control for forcibly decelerating the target vehicle 100 by applying braking forces only to the right or left wheels of the target vehicle 100 and forcibly turning the target vehicle 100 by applying a steering force to the target vehicle 100 to pass by the forward object 200. That is, when forcibly turning the target vehicle 100 rightward to swerve around the forward object 200, the single-side braking steering avoidance control is control for forcibly decelerating the target vehicle 100 by applying braking forces only to the right wheels of the target vehicle 100 and forcibly turning the target vehicle 100 to swerve around the forward object 200. When forcibly turning the target vehicle 100 leftward to swerve around the forward object 200, the single-side braking steering avoidance control is control for forcibly decelerating the target vehicle 100 by applying braking forces only to the left wheels of the target vehicle 100 and forcibly turning the target vehicle 100 to swerve around the forward object 200.

Therefore, when forcibly turning the target vehicle 100 to pass on the right side of the forward object 200 by the single-side braking steering avoidance control, the driving assistance device 10 applies the braking forces only to the right wheels of the target vehicle 100 without applying the braking forces to the left wheels of the target vehicle 100, and forcibly turns the target vehicle 100. Accordingly, the braking forces are applied only to the right wheels of the target vehicle 100 when forcibly turning the target vehicle 100 rightward by starting the single-side braking steering avoidance control. Thus, the target vehicle 100 can greatly be turned rightward.

When forcibly turning the target vehicle 100 to pass on the left side of the forward object 200 by the single-side braking steering avoidance control, the driving assistance device 10 applies the braking forces only to the left wheels of the target vehicle 100 without applying the braking forces to the right wheels of the target vehicle 100, and forcibly turns the target vehicle 100. Accordingly, the braking forces are applied only to the left wheels of the target vehicle 100 when forcibly turning the target vehicle 100 leftward by starting the single-side braking steering avoidance control. Thus, the target vehicle 100 can greatly be turned leftward.

Execution of Single-Side Braking Steering Avoidance Control

The driving assistance device 10 executes the single-side braking steering avoidance control when the turning amount increase request condition is satisfied. When the single-side braking steering avoidance control is started and a space where the target vehicle 100 can travel is present on the right side of the forward object 200 as shown in FIG. 8A, the driving assistance device 10 sets a path along which the target vehicle 100 passes on the right side of the forward object 200 as a path along which the target vehicle 100 travels (target traveling path Rtgt). When a space where the target vehicle 100 can travel is present on the left side of the forward object 200, the driving assistance device 10 sets a path along which the target vehicle 100 passes on the left side of the forward object 200 as the path along which the target vehicle 100 travels (target traveling path Rtgt).

As shown in FIG. 8B, the driving assistance device 10 applies the braking forces only to the wheels on one side of the target vehicle 100, and starts to apply the steering force to the target vehicle 100 to travel along the target traveling path Rtgt.

Therefore, the target vehicle 100 travels beside the forward object 200 as shown in FIG. 9A and passes by the forward object 200 as shown in FIG. 9B. Thus, the collision between the target vehicle 100 and the forward object 200 is avoided. When the target vehicle 100 has passed by the forward object 200, the driving assistance device 10 terminates the single-side braking steering avoidance control.

Accordingly, it is possible to avoid the collision between the target vehicle 100 and the forward object 200 even in the situation in which the turning amount increase request condition is satisfied.

In the case where the single-side braking steering avoidance control is executed to cause the target vehicle 100 to pass on the right side of the forward object 200, the driving assistance device 10 forcibly turns the target vehicle 100 rightward and then applies no braking forces to the target vehicle 100 when and after turning the target vehicle 100 leftward (returning the steering angle). For example, the braking forces may be applied only to the left wheels of the target vehicle 100 when turning the target vehicle 100 leftward. Similarly, in the case where the single-side braking steering avoidance control is executed to cause the target vehicle 100 to pass on the left side of the forward object 200, the driving assistance device 10 forcibly turns the target vehicle 100 leftward and then applies no braking forces to the target vehicle 100 when and after turning the target vehicle 100 rightward (returning the steering angle). For example, the braking forces may be applied only to the right wheels of the target vehicle 100 when turning the target vehicle 100 rightward.

Execution of Dual-Side Braking Steering Avoidance Control

Figure 10A:
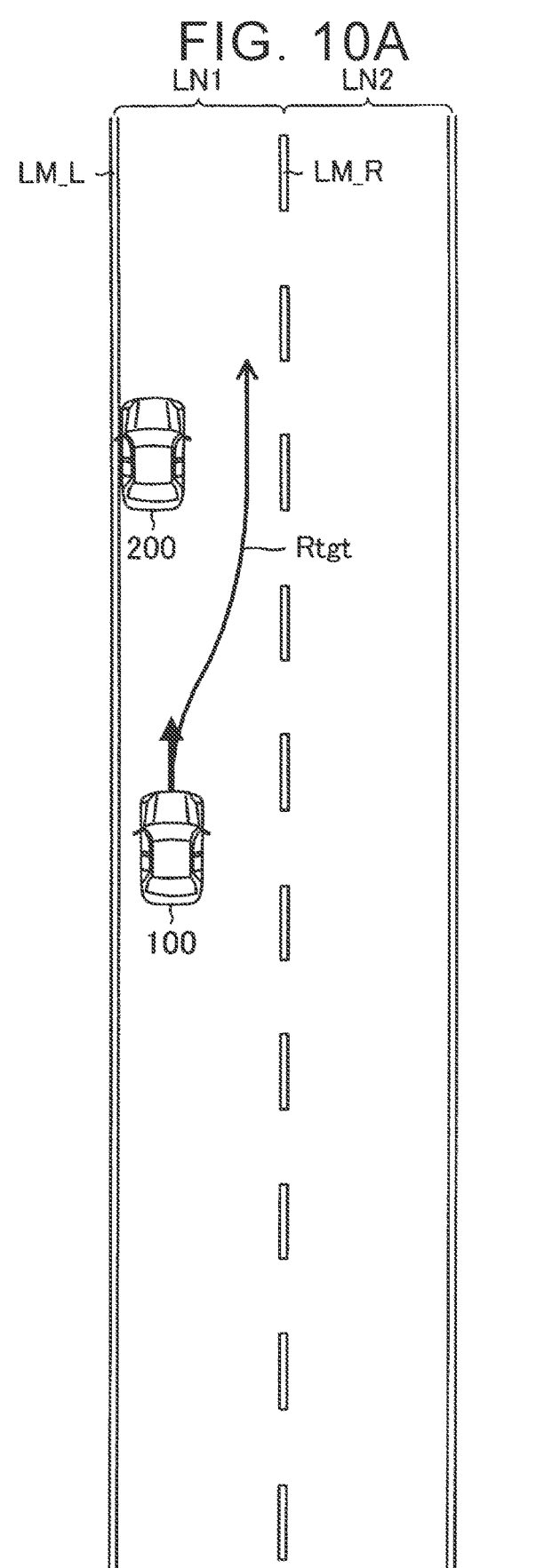
FIG. 10A is a diagram showing a target traveling path set by dual-side braking steering avoidance control.

The driving assistance device 10 executes the dual-side braking steering avoidance control when the turning amount increase request condition is not satisfied. When the dual-side braking steering avoidance control is started and a space where the target vehicle 100 can travel is present on the right side of the forward object 200 as shown in FIG. 10A, the driving assistance device 10 sets a path along which the target vehicle 100 passes on the right side of the forward object 200 as the path along which the target vehicle 100 travels (target traveling path Rtgt). When a space where the target vehicle 100 can travel is present on the left side of the forward object 200, the driving assistance device 10 sets a path along which the target vehicle 100 passes on the left side of the forward object 200 as the path along which the target vehicle 100 travels (target traveling path Rtgt).

Figure 10B:
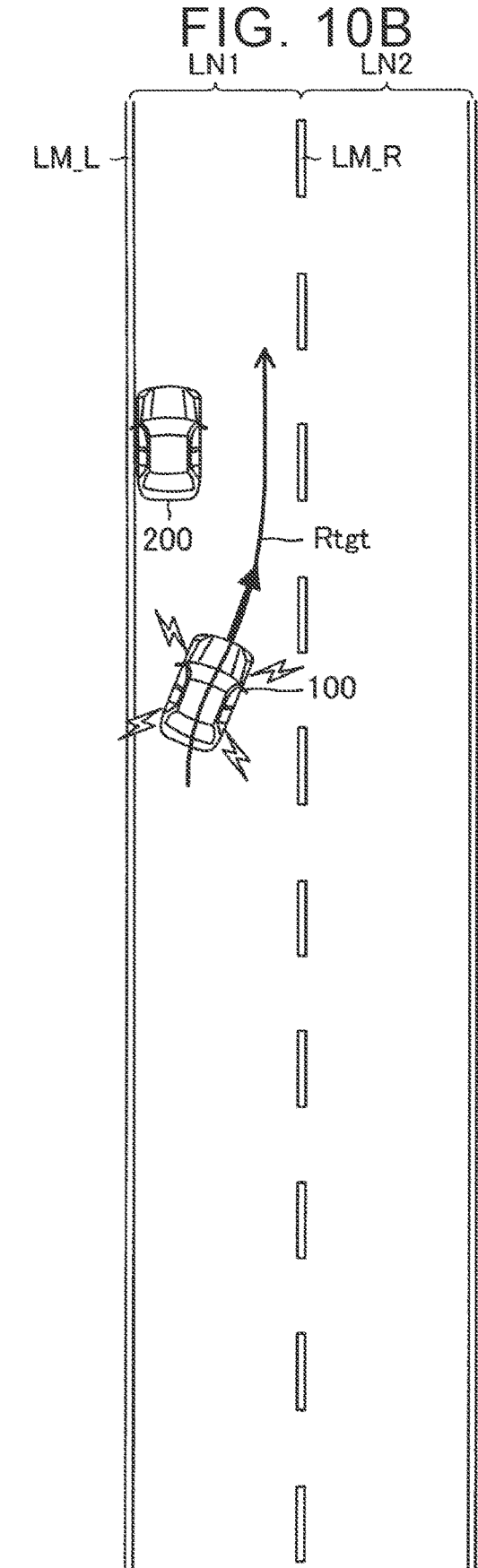
FIG. 10B is a diagram showing a scene in which the target vehicle starts to turn along the target traveling path by the dual-side braking steering avoidance control.

As shown in FIG. 10B, the driving assistance device 10 applies the braking forces to the wheels on both sides of the target vehicle 100, and starts to apply the steering force to the target vehicle 100 to travel along the target traveling path Rtgt.

Figure 11A:
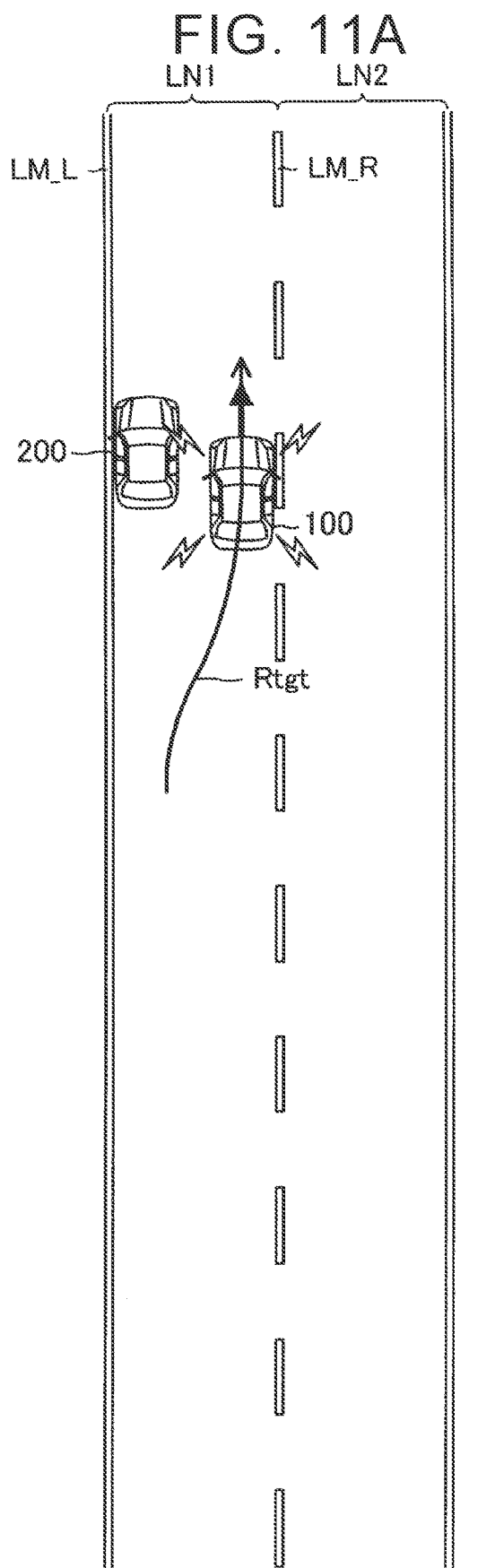
FIG. 11A is a diagram showing a scene in which the target vehicle is passing by the object (vehicle) by the dual-side braking steering avoidance control.
Figure 11B:
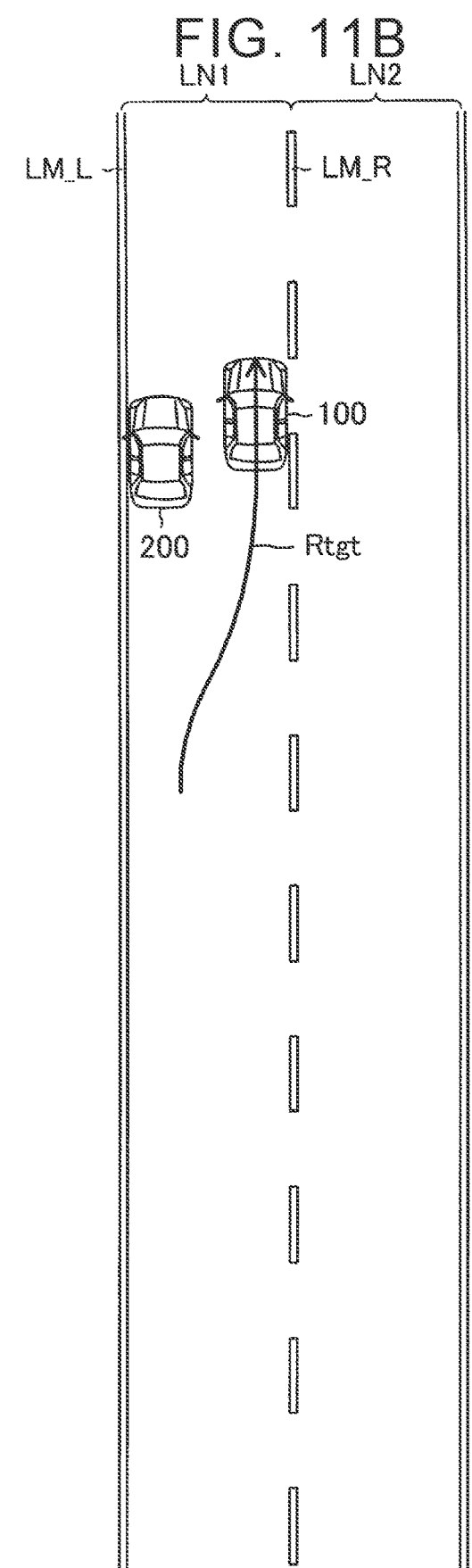
FIG. 11B is a diagram showing a scene in which the target vehicle has passed by the object (vehicle) and the dual-side braking steering avoidance control is terminated.

Therefore, the target vehicle 100 travels beside the forward object 200 as shown in FIG. 11A and passes by the forward object 200 as shown in FIG. 11B. Thus, the collision between the target vehicle 100 and the forward object 200 is avoided. When the target vehicle 100 has passed by the forward object 200, the driving assistance device 10 terminates the dual-side braking steering avoidance control. In the case where the dual-side braking steering avoidance control is executed, the target vehicle 100 is stopped when it reaches the space beside the forward object 200.

Accordingly, the collision between the target vehicle 100 and the forward object 200 can be avoided.

Non-Braking Steering Avoidance Control

Figures 12A, 12B:
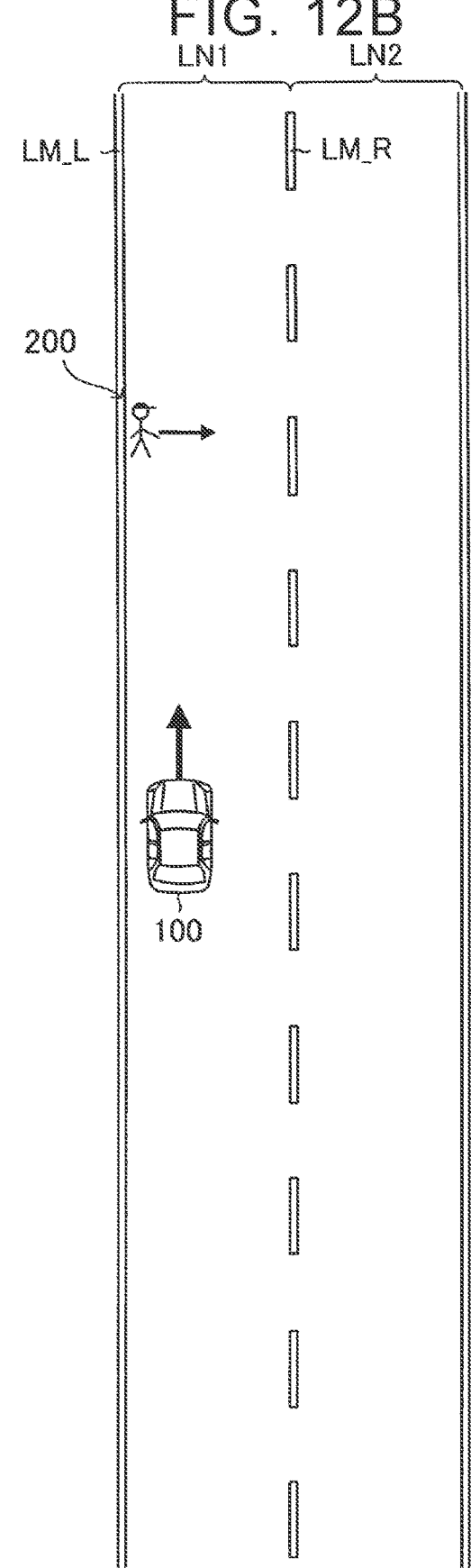
FIG. 12A is a diagram showing a scene in which a succeeding vehicle (a vehicle traveling behind the target vehicle) is present when the collision avoidance control execution condition is satisfied.
FIG. 12B is a diagram showing a scene in which the collision avoidance control execution condition is satisfied for an object (person) about to cross a target-vehicle lane.

When the steering avoidance control involving deceleration of the target vehicle 100, such as the single-side braking steering avoidance control or the dual-side braking steering avoidance control, is executed in a case where a vehicle (succeeding vehicle 300) traveling behind the target vehicle 100 is present and the distance between the succeeding vehicle 300 and the target vehicle 100 is shorter than a predetermined distance as shown in FIG. 12A, the succeeding vehicle 300 may collide with the target vehicle 100.

When the steering avoidance control involving deceleration of the target vehicle 100, such as the single-side braking steering avoidance control or the dual-side braking steering avoidance control, is executed in a case where the forward object 200 is an object such as a person moving in the lateral direction relative to the target-vehicle lane LN1 as shown in FIG. 12B, the target vehicle 100 may collide with the forward object 200 depending on the moving speed of the forward object 200.

Therefore, the driving assistance device 10 may execute non-braking steering avoidance control when a braking prohibition condition is satisfied in the case where the steering avoidance request condition is satisfied.

The non-braking steering avoidance control is control for forcibly turning the target vehicle 100 to pass by the forward object 200 by forcibly applying a steering force to the target vehicle 100 without applying braking forces to the target vehicle 100.

The braking prohibition condition is a condition for prohibiting the execution of the steering avoidance control involving application of the braking forces to the target vehicle 100 (single-side braking steering avoidance control or dual-side braking steering avoidance control). For example, the braking prohibition condition is a condition that the succeeding vehicle 300 may collide with the target vehicle 100 when the steering avoidance control involving application of the braking forces to the target vehicle 100 (single-side braking steering avoidance control or dual-side braking steering avoidance control) is executed, and/or a condition that the target vehicle 100 may collide with the forward object 200 when the steering avoidance control involving application of the braking forces to the target vehicle 100 (single-side braking steering avoidance control or dual-side braking steering avoidance control) is executed but the target vehicle 100 can pass by the forward object 200 without deceleration of the target vehicle 100.

The determination as to whether the succeeding vehicle 300 may collide with the target vehicle 100 when the steering avoidance control involving application of the braking forces to the target vehicle 100 is executed and the determination as to whether the target vehicle 100 may collide with the forward object 200 when the steering avoidance control involving application of the braking forces to the target vehicle 100 is executed but the target vehicle 100 can pass by the forward object 200 without deceleration of the target vehicle 100 are made based on the peripheral detection information ID.

Figure 13A:
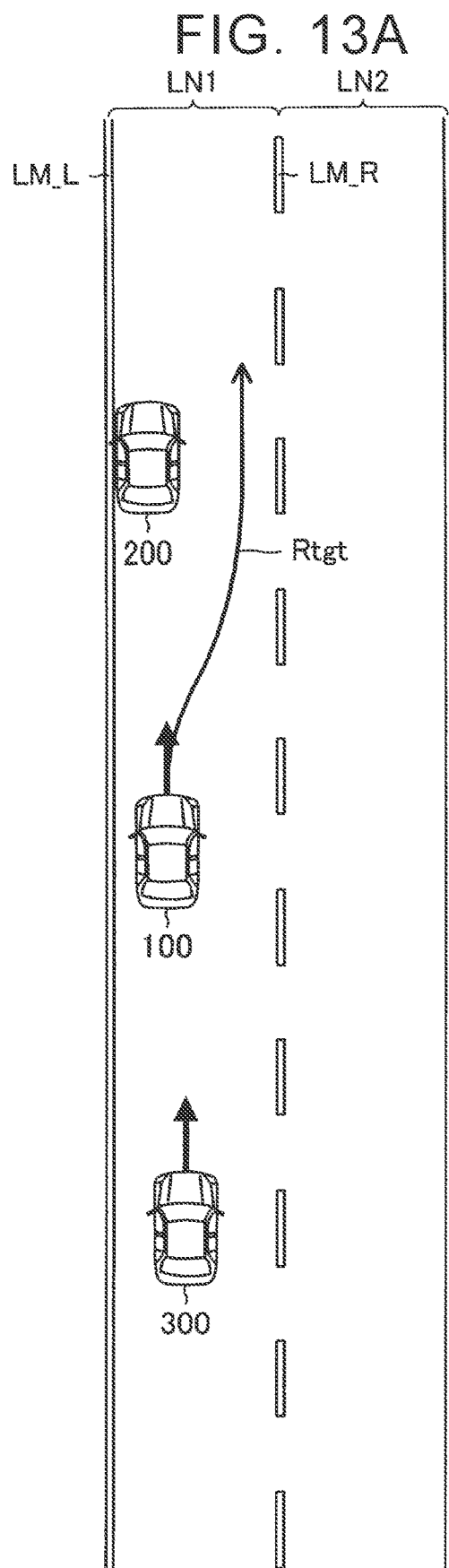
FIG. 13A is a diagram showing a target traveling path set by non-braking steering avoidance control.

When the non-braking steering avoidance control is started and a space where the target vehicle 100 can travel is present on the right side of the forward object 200 as shown in FIG. 13A, the driving assistance device 10 sets a path along which the target vehicle 100 passes on the right side of the forward object 200 as the path along which the target vehicle 100 travels (target traveling path Rtgt). When a space where the target vehicle 100 can travel is present on the left side of the forward object 200, the driving assistance device 10 sets a path along which the target vehicle 100 passes on the left side of the forward object 200 as the path along which the target vehicle 100 travels (target traveling path Rtgt).

Figure 13B:
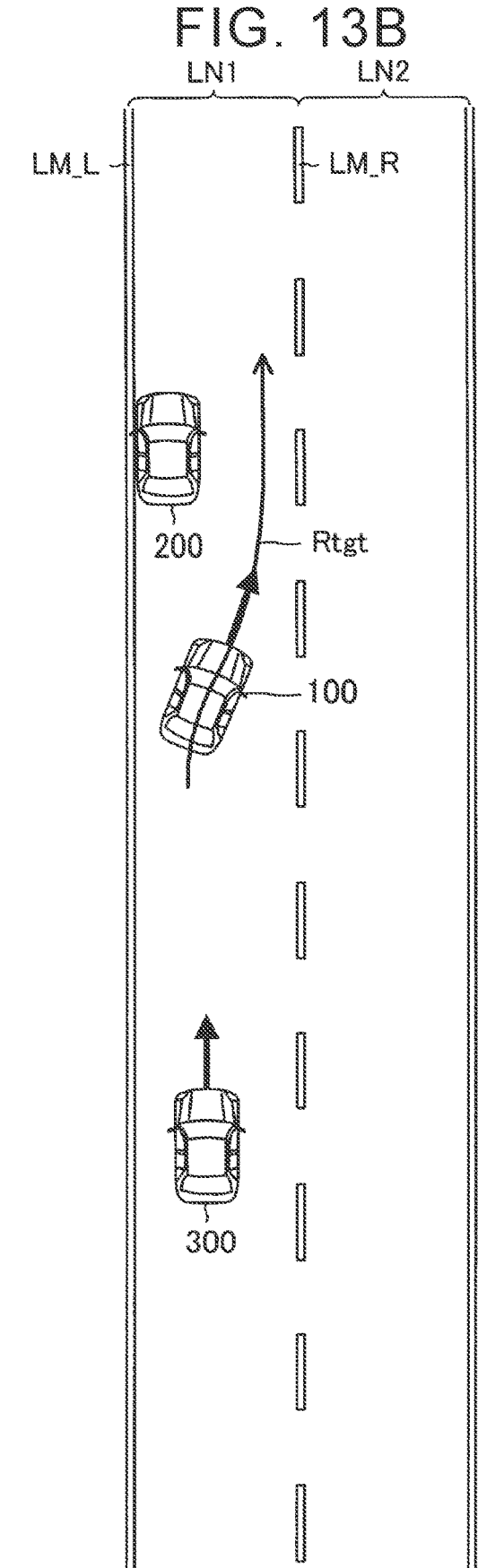
FIG. 13B is a diagram showing a scene in which the target vehicle starts to turn along the target traveling path by the non-braking steering avoidance control.

As shown in FIG. 13B, the driving assistance device 10 starts to apply the steering force to the target vehicle 100 to travel along the target traveling path Rtgt. At this time, the driving assistance device 10 does not apply the braking forces to the target vehicle 100.

Figures 14A, 14B:
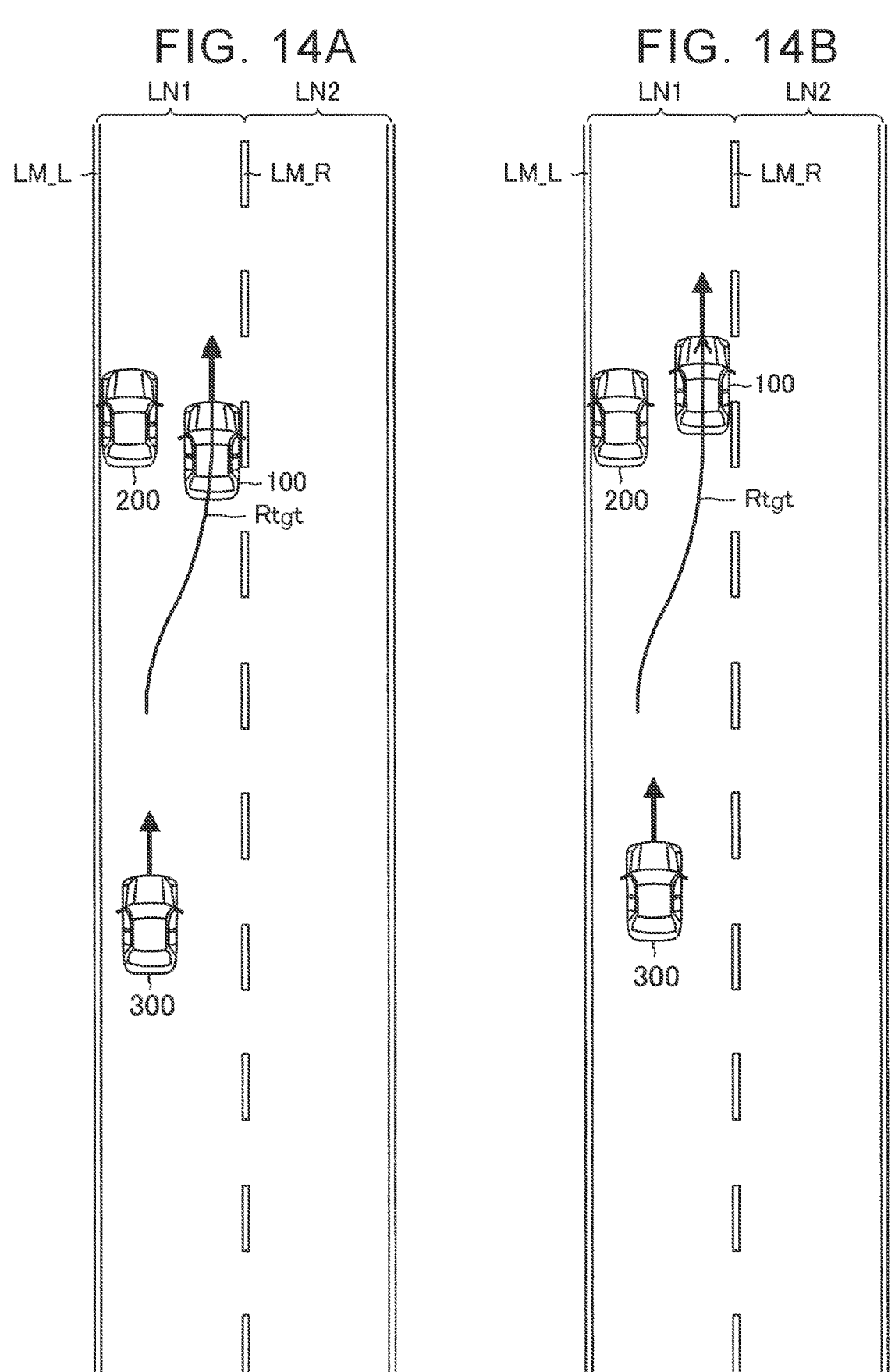
FIG. 14A is a diagram showing a scene in which the target vehicle is passing by the object (vehicle) by the non-braking steering avoidance control.
FIG. 14B is a diagram showing a scene in which the target vehicle has passed by the object (vehicle) and the non-braking steering avoidance control is terminated.

Therefore, the target vehicle 100 travels beside the forward object 200 as shown in FIG. 14A and passes by the forward object 200 as shown in FIG. 14B. Thus, the collision between the target vehicle 100 and the forward object 200 is avoided. When the target vehicle 100 has passed by the forward object 200, the driving assistance device 10 terminates the non-braking steering avoidance control.

Accordingly, it is possible to avoid the collision between the target vehicle 100 and the forward object 200 even in the situation in which the braking prohibition condition is satisfied.

Steering Avoidance Prohibition Condition

Figure 15:
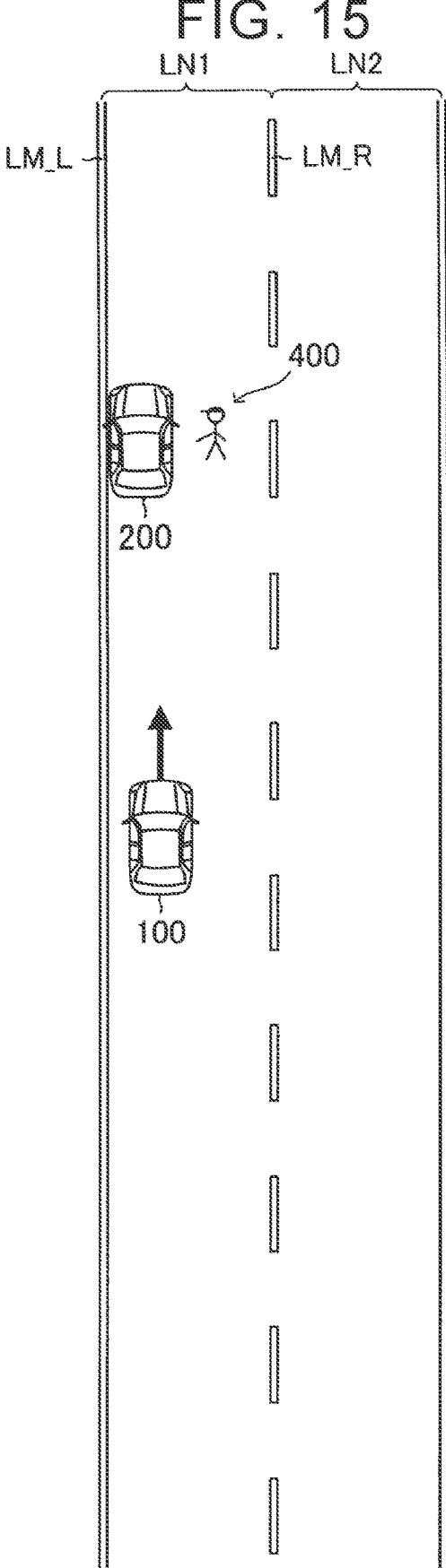
FIG. 15 is a diagram showing a scene in which another object (person) is present in a space next to a forward object (vehicle) that is a target of collision avoidance.

When the steering avoidance control (single-side braking steering avoidance control, dual-side braking steering avoidance control, or non-braking steering avoidance control) is executed in a situation in which an object such as a person (secondary object 400) is present in the space beside the forward object 200 as shown in FIG. 15, the target vehicle 100 may collide with the secondary object 400 if the target traveling path Rtgt is set through the space where the secondary object 400 is present and the target vehicle 100 travels along the target traveling path Rtgt. In such a case, in some embodiments, the steering avoidance control may not be executed.

Therefore, when a steering avoidance prohibition condition is satisfied, the driving assistance device 10 may execute the braking avoidance control instead of the steering avoidance control even if the steering avoidance request condition is satisfied.

Accordingly, it is possible to avoid the collision between the target vehicle 100 and the forward object 200 even in the situation in which the steering avoidance prohibition condition is satisfied.

Lane Change Collision Avoidance Control

When an attempt is made to avoid the collision between the target vehicle 100 and the forward object 200 by the steering avoidance control, there is a possibility that the space where the target vehicle 100 can pass is not present beside the forward object 200 within the range of the target-vehicle lane LN1. Therefore, in the case where the space where the target vehicle 100 can pass is not present beside the forward object 200 within the range of the target-vehicle lane LN1 and a parallel traveling lane adjacent to the target-vehicle lane LN1 is present when the attempt is made to avoid the collision between the target vehicle 100 and the forward object 200 by the steering avoidance control, the driving assistance device 10 may execute lane change collision avoidance control for causing the target vehicle 100 to change the lane to the parallel traveling lane under the condition that the safety of the target vehicle 100 in the lane change to the parallel traveling lane is ensured (the target vehicle 100 does not come into contact with another vehicle traveling in the parallel traveling lane).

Accordingly, it is possible to avoid the collision between the target vehicle 100 and the forward object 200 even in the situation in which the space where the target vehicle 100 can pass is not present beside the forward object 200 within the range of the target-vehicle lane LN1 when the attempt is made to avoid the collision between the target vehicle 100 and the forward object 200 by the steering avoidance control.

Specific Operation of Driving Assistance Device

Next, specific operation of the driving assistance device 10 will be described. The CPU of the ECU 90 of the driving assistance device 10 according to the embodiment of the present disclosure executes a routine shown in FIG. 16 in a predetermined calculation cycle. At a predetermined timing, the CPU starts the process from Step 1600 of the routine shown in FIG. 16, and advances the process to Step 1605 to determine whether the collision avoidance control execution condition is satisfied.

When the CPU determines "Yes" in Step 1605, the CPU advances the process to Step 1610 to determine whether the steering avoidance request condition is satisfied. When the CPU determines "Yes" in Step 1610, the CPU advances the process to Step 1615 to determine whether the braking prohibition condition is satisfied. When the CPU determines "No" in Step 1615, the CPU advances the process to Step 1620 to determine whether the steering avoidance prohibition condition is satisfied. When the CPU determines "No" in Step 1620, the CPU advances the process to Step 1625 to determine whether the turning amount increase request condition is satisfied. When the CPU determines "Yes" in Step 1625, the CPU advances the process to Step 1630 to execute the single-side braking steering avoidance control. Next, the CPU advances the process to Step 1655.

When the CPU determines "No" in Step 1625, the CPU advances the process to Step 1635 to execute the dual-side braking steering avoidance control. Next, the CPU advances the process to Step 1655.

When the CPU determines "Yes" in Step 1620, the CPU advances the process to Step 1650 to execute the braking avoidance control. Next, the CPU advances the process to Step 1655.

When the CPU determines "Yes" in Step 1615, the CPU advances the process to Step 1645 to execute the non-braking steering avoidance control. Next, the CPU advances the process to Step 1655.

When the CPU determines "No" in Step 1610, the CPU advances the process to Step 1640 to execute the braking avoidance control. Next, the CPU advances the process to Step 1655.

When the CPU advances the process to Step 1655, the CPU determines whether the avoidance of the collision between the target vehicle 100 and the forward object 200 by the collision avoidance control is completed. When the CPU determines "Yes" in Step 1655, the CPU advances the process to Step 1660 to terminate the currently executed collision avoidance control. Next, the CPU advances the process to Step 1695 to temporarily terminate the process of this routine.

When the CPU determines "No" in Step 1655, the CPU advances the process directly to Step 1695 to temporarily terminate the process of this routine.

When the CPU determines "No" in Step 1605, the CPU advances the process directly to Step 1695 to temporarily terminate the process of this routine.

The above is the specific operation of the driving assistance device 10.

The present disclosure is not limited to the embodiment described above, and a variety of modifications can be adopted within the scope of the present disclosure.

What is claimed is:

1. A driving assistance device comprising electronic control unit configured to execute collision avoidance control for avoiding collision between a target vehicle and an object ahead of the target vehicle by decelerating the target vehicle and turning the target vehicle to swerve around the object, wherein the electronic control unit is configured to:

execute, as the collision avoidance control, dual-side braking steering avoidance control for decelerating the target vehicle by applying equal or substantially equal braking forces to wheels on both sides of the target vehicle and turning the target vehicle to swerve around the object in a case where a turning amount increase request condition that a request is made to increase a turning rate that is a turning amount of the target vehicle relative to an amount of change in a steering angle of the target vehicle when the target vehicle is turned by the collision avoidance control is not satisfied, the substantially equal braking forces including a difference that falls within a range smaller than a predetermined value;

when turning the target vehicle rightward by the collision avoidance control to swerve around the object in a case where the turning amount increase request condition is satisfied, execute, as the collision avoidance control, single-side braking steering avoidance control for decelerating the target vehicle by applying, to a right wheel of the target vehicle, a braking force larger than a braking force applied to a left wheel, and turning the target vehicle to swerve around the object; and when turning the target vehicle leftward by the collision avoidance control to swerve around the object in the case where the turning amount increase request condition is satisfied, execute, as the collision avoidance control, the single-side braking steering avoidance control for decelerating the target vehicle by applying, to the left wheel of the target vehicle, a braking force larger than a braking force applied to the right wheel, and turning the target vehicle to swerve around the object, wherein the turning amount increase request condition is satisfied when an overlap rate between the target vehicle and the object is higher than a predetermined value, the overlap rate corresponding to a value indicating a rate of overlap between a width of the target vehicle and a width of the object, in a case where a steering avoidance request condition is not satisfied, the electronic control unit is configured to execute braking avoidance control, and in a case where the steering avoidance request is satisfied, the electronic control unit is configured to execute steering avoidance control, and in a case where the steering avoidance request condition is satisfied and a steering avoidance prohibition condition is satisfied, the electronic control unit is configured to not execute the steering avoidance control and execute the braking avoidance control.

2. The driving assistance device according to claim 1, wherein the turning amount increase request condition is satisfied when the target vehicle is not expected to swerve around the object by the dual-side braking steering avoidance control.

3. The driving assistance device according to claim 1, wherein the turning amount increase request condition is satisfied when the turning rate required to swerve the target vehicle around the object is higher than a predetermined turning rate.

4. The driving assistance device according to claim 3, wherein the predetermined turning rate is a maximum value of the turning rate that is achievable by the dual-side braking steering avoidance control.

5. The driving assistance device according to claim 1, wherein the turning amount increase request condition is satisfied when the turning amount of the target vehicle that is achievable by the dual-side braking steering avoidance control is smaller than the turning amount of the target vehicle that is required to swerve the target vehicle around the object.

6. The driving assistance device according to claim 1, wherein the turning amount increase request condition is satisfied when a relative speed between the target vehicle and the object is higher than a predetermined speed.

7. The driving assistance device according to claim 1, wherein:

the collision avoidance control includes the braking avoidance control for avoiding the collision between the target vehicle and the object by decelerating and stopping the target vehicle without turning the target vehicle; and the electronic control unit is configured to:

execute the braking avoidance control in a case where a deceleration of the target vehicle when the braking avoidance control is executed is equal to or lower than a predetermined deceleration; and execute the dual-side braking steering avoidance control or the single-side braking steering avoidance control in a case where the deceleration of the target vehicle when the braking avoidance control is executed is higher than the predetermined deceleration.

8. The driving assistance device according to claim 7, wherein the electronic control unit is configured to execute, in a case in which a second object is present in a space beside the object and a target traveling path is set through the space where the second object is present and the target vehicle travels along the target traveling path, the braking avoidance control to avoid collision with the second object instead of the single-side braking steering avoidance control or the dual-side braking steering avoidance control even if the steering avoidance request condition is satisfied.

9. The driving assistance device according to claim 1, wherein the electronic control unit is configured to execute neither the dual-side braking steering avoidance control nor the single-side braking steering avoidance control in a case where the target vehicle has a possibility of colliding with an object other than the object when the dual-side braking steering avoidance control or the single-side braking steering avoidance control is executed.

10. The driving assistance device according to claim 1, wherein the steering avoidance request condition is at least one of:

a condition in which the deceleration of the target vehicle when the braking avoidance control is executed is higher than a predetermined deceleration, a condition in which a current target vehicle speed is higher than a predetermined vehicle speed, or a condition in which a steering avoidance limit period associated with the current target vehicle speed is shorter than a braking avoidance limit period associated with the current target vehicle speed.

11. A driving assistance method for avoiding collision between a target vehicle and an object ahead of the target vehicle by executing collision avoidance control for decelerating the target vehicle and turning the target vehicle to swerve around the object, the driving assistance method comprising:

executing, as the collision avoidance control, dual-side braking steering avoidance control for decelerating the target vehicle by applying equal or substantially equal braking forces to wheels on both sides of the target vehicle and turning the target vehicle to swerve around the object in a case where a turning amount increase request condition that a request is made to increase a turning rate that is a turning amount of the target vehicle relative to an amount of change in a steering angle of the target vehicle when the target vehicle is turned by the collision avoidance control is not satisfied, the substantially equal braking forces including a difference that falls within a range smaller than a predetermined value;

when turning the target vehicle rightward by the collision avoidance control to swerve around the object in a case where the turning amount increase request condition is satisfied, executing, as the collision avoidance control, single-side braking steering avoidance control for decelerating the target vehicle by applying, to a right wheel of the target vehicle, a braking force larger than a braking force applied to a left wheel, and turning the target vehicle to swerve around the object; and when turning the target vehicle leftward by the collision avoidance control to swerve around the object in the case where the turning amount increase request condition is satisfied, executing, as the collision avoidance control, the single-side braking steering avoidance control for decelerating the target vehicle by applying, to the left wheel of the target vehicle, a braking force larger than a braking force applied to the right wheel, and turning the target vehicle to swerve around the object, wherein the turning amount increase request condition is satisfied when an overlap rate between the target vehicle and the object is higher than a predetermined value, the overlap rate corresponding to a value indicating a rate of overlap between a width of the target vehicle and a width of the object, in a case where a steering avoidance request condition is not satisfied, executing braking avoidance control, and in a case where the steering avoidance request is satisfied, executing steering avoidance control, and in a case where the steering avoidance request condition is satisfied and a steering avoidance prohibition condition is satisfied, not executing the steering avoidance control and executing the braking avoidance control.

12. The driving assistance method according to claim 11, wherein the turning amount increase request condition is satisfied when the target vehicle is not expected to swerve around the object by the dual-side braking steering avoidance control.

13. The driving assistance method according to claim 11, wherein the turning amount increase request condition is satisfied when the turning rate required to swerve the target vehicle around the object is higher than a predetermined turning rate.

14. The driving assistance method according to claim 13, wherein the predetermined turning rate is a maximum value of the turning rate that is achievable by the dual-side braking steering avoidance control.

15. The driving assistance method according to claim 11, wherein the turning amount increase request condition is satisfied when the turning amount of the target vehicle that is achievable by the dual-side braking steering avoidance control is smaller than the turning amount of the target vehicle that is required to swerve the target vehicle around the object.

16. The driving assistance method according to claim 11, wherein the turning amount increase request condition is satisfied when a relative speed between the target vehicle and the object is higher than a predetermined speed.

17. The driving assistance method according to claim 11, wherein:

the collision avoidance control includes the braking avoidance control for avoiding the collision between the target vehicle and the object by decelerating and stopping the target vehicle without turning the target vehicle; and the driving assistance method includes:

executing the braking avoidance control in a case where a deceleration of the target vehicle when the braking avoidance control is executed is equal to or lower than a predetermined deceleration; and executing the dual-side braking steering avoidance control or the single-side braking steering avoidance control in a case where the deceleration of the target vehicle when the braking avoidance control is executed is higher than the predetermined deceleration.

18. The driving assistance method according to claim 11, further comprising executing neither the dual-side braking steering avoidance control nor the single-side braking steering avoidance control in a case where the target vehicle has a possibility of colliding with an object other than the object when the dual-side braking steering avoidance control or the single-side braking steering avoidance control is executed.

19. A non-transitory storage medium storing instructions that are executable by one or more processors mounted on a vehicle and that cause the one or more processors to perform functions comprising:

executing collision avoidance control for decelerating a target vehicle and turning the target vehicle to swerve around an object ahead of the target vehicle;

executing, as the collision avoidance control, dual-side braking steering avoidance control for decelerating the target vehicle by applying equal or substantially equal braking forces to wheels on both sides of the target vehicle and turning the target vehicle to swerve around the object in a case where a turning amount increase request condition that a request is made to increase a turning rate that is a turning amount of the target vehicle relative to an amount of change in a steering angle of the target vehicle when the target vehicle is turned by the collision avoidance control is not satisfied, the substantially equal braking forces including a difference that falls within a range smaller than a predetermined value;

when turning the target vehicle rightward by the collision avoidance control to swerve around the object in a case where the turning amount increase request condition is satisfied, executing, as the collision avoidance control, single-side braking steering avoidance control for decelerating the target vehicle by applying, to a right wheel of the target vehicle, a braking force larger than a braking force applied to a left wheel, and turning the target vehicle to swerve around the object; and when turning the target vehicle leftward by the collision avoidance control to swerve around the object in the case where the turning amount increase request condition is satisfied, executing, as the collision avoidance control, the single-side braking steering avoidance control for decelerating the target vehicle by applying, to the left wheel of the target vehicle, a braking force larger than a braking force applied to the right wheel, and turning the target vehicle to swerve around the object, wherein the turning amount increase request condition is satisfied when an overlap rate between the target vehicle and the object is higher than a predetermined value, the overlap rate corresponding to a value indicating a rate of overlap between a width of the target vehicle and a width of the object, in a case where a steering avoidance request condition is not satisfied, executing braking avoidance control, and in a case where the steering avoidance request is satisfied, executing steering avoidance control, and in a case where the steering avoidance request condition is satisfied and a steering avoidance prohibition condition is satisfied, not executing the steering avoidance control and executing the braking avoidance control.

\* \* \* \* \*